(12) United States Patent
Small et al.

(10) Patent No.: US 7,941,090 B2
(45) Date of Patent: May 10, 2011

(54) INTERACTIVE BOOK READING SYSTEM USING RF SCANNING CIRCUIT

(75) Inventors: David B. Small, San Jose, CA (US); Paul S. Rago, Danville, CA (US); James M. Hair, III, Cheyenne, WY (US)

(73) Assignee: Shoot the Moon Products II, LLC, Pleasanton, CA (US)

( * ) Notice: Subject to any disclaimer, the term of this patent is extended or adjusted under 35 U.S.C. 154(b) by 1872 days.

(21) Appl. No.: 10/758,779

(22) Filed: Jan. 16, 2004

(65) Prior Publication Data

US 2004/0219501 A1   Nov. 4, 2004

Related U.S. Application Data

(63) Continuation of application No. PCT/US02/14745, filed on May 10, 2002.

(60) Provisional application No. 60/290,444, filed on May 11, 2001.

(51) Int. Cl.
*G09B 5/00* (2006.01)
(52) U.S. Cl. .................. 434/317; 434/356; 434/359
(58) Field of Classification Search .............. 434/118, 434/169, 307 R, 308, 323, 365, 178, 317, 434/171, 173; 345/173, 440; 709/203; 361/684; 715/839; 178/18.01; 283/83; 380/25
See application file for complete search history.

(56) References Cited

U.S. PATENT DOCUMENTS

| | | | |
|---|---|---|---|
| 3,798,370 A | 3/1974 | Hurst et al. | |
| 3,911,215 A | 10/1975 | Hurst et al. | |
| 4,220,815 A | 9/1980 | Gibson et al. | |
| 4,380,007 A | 4/1983 | Steinegger | |
| 4,514,817 A | 4/1985 | Pepper et al. | |
| 4,550,310 A | 10/1985 | Yamaguchi et al. | |
| 4,556,871 A | 12/1985 | Yoshikawa et al. | |
| 4,557,694 A | 12/1985 | Nelson | |
| 4,561,002 A | 12/1985 | Chiu | |
| 4,567,470 A | 1/1986 | Yoshikawa et al. | |
| 4,571,454 A | 2/1986 | Tamaru et al. | |
| 4,686,332 A | 8/1987 | Greanias et al. | |
| 4,723,056 A | 2/1988 | Tamaru et al. | |
| 4,766,368 A | 8/1988 | Cox | |
| 4,853,498 A | 8/1989 | Meadows et al. | |
| 4,853,499 A | 8/1989 | Watson | |
| 4,890,096 A | 12/1989 | Taguchi et al. | |
| 4,970,659 A | 11/1990 | Breedlove et al. | |
| 5,007,085 A | 4/1991 | Greanias et al. | |
| 5,113,178 A | 5/1992 | Yasuda et al. | |
| 5,129,654 A | 7/1992 | Bogner | |

(Continued)

*Primary Examiner* — Xuan M. Thai
*Assistant Examiner* — Banafsheh Hadizonooz
(74) *Attorney, Agent, or Firm* — Panitch Schwarze Belisario & Nadel LLP

(57) ABSTRACT

An interactive book reading system (600) responsive to a human finger presence. The system (600) includes a radio frequency (RF) scanning circuit (675), a control circuit (610), a memory (615) and an audible output device (650). The RF scanning circuit (675) is configured to detect the presence of the human finger when the finger enters an RF field generated by the RF scanning circuit (675). The control circuit (610) and the memory (615) are in communication with the RF scanning circuit (675). The memory (615) stores a plurality of audible messages. The audible output device (650) is also in communication with the control circuit (610). The audible output device (650) outputs at least one of the audible messages based on an analysis of the RF field performed by the control circuit (610) when the finger enters the RF field.

29 Claims, 15 Drawing Sheets

U.S. PATENT DOCUMENTS

| | | |
|---|---|---|
| 5,166,679 A | 11/1992 | Vranish et al. |
| 5,174,759 A * | 12/1992 | Preston et al. ............... 434/317 |
| 5,220,136 A | 6/1993 | Kent |
| 5,257,431 A | 11/1993 | Larson et al. |
| 5,305,017 A | 4/1994 | Gerpheide |
| 5,363,051 A | 11/1994 | Jenstrom et al. |
| 5,374,787 A | 12/1994 | Miller et al. |
| 5,397,890 A | 3/1995 | Schueler et al. |
| 5,418,551 A | 5/1995 | Ise |
| 5,463,388 A | 10/1995 | Boie et al. |
| 5,466,158 A * | 11/1995 | Smith, III ................... 434/317 |
| 5,485,176 A * | 1/1996 | Ohara et al. ................. 345/173 |
| 5,508,700 A | 4/1996 | Taylor et al. |
| 5,539,292 A | 7/1996 | Vranish |
| 5,546,538 A * | 8/1996 | Cobbley et al. ............... 709/203 |
| 5,565,658 A | 10/1996 | Gerpheide et al. |
| 5,636,995 A | 6/1997 | Sharpe, III et al. |
| 5,648,642 A | 7/1997 | Miller et al. |
| 5,650,597 A | 7/1997 | Redmayne |
| 5,651,044 A | 7/1997 | Klotz, Jr. et al. |
| 5,661,635 A * | 8/1997 | Huffman et al. ............. 361/684 |
| 5,722,686 A | 3/1998 | Blackburn et al. |
| 5,761,485 A * | 6/1998 | Munyan ....................... 715/839 |
| 5,801,340 A | 9/1998 | Peter |
| 5,810,604 A | 9/1998 | Kopp, Jr. et al. |
| 5,825,352 A * | 10/1998 | Bisset et al. ................. 345/173 |
| 5,831,600 A * | 11/1998 | Inoue et al. .................. 345/173 |
| 5,861,583 A | 1/1999 | Schediwy et al. |
| 5,877,458 A * | 3/1999 | Flowers ..................... 178/18.01 |
| 5,889,236 A | 3/1999 | Gillespie et al. |
| 5,914,465 A | 6/1999 | Allen et al. |
| 5,920,309 A | 7/1999 | Bisset et al. |
| 5,933,288 A | 8/1999 | Plesko |
| 5,973,318 A | 10/1999 | Plesko |
| 6,067,026 A | 5/2000 | Weimer et al. |
| 6,072,980 A | 6/2000 | Manico et al. |
| 6,094,610 A | 7/2000 | Steffens, Jr. et al. |
| 6,104,386 A * | 8/2000 | Yaotani ........................ 345/173 |
| 6,201,947 B1 | 3/2001 | Hur et al. |
| 6,222,528 B1 | 4/2001 | Gerpheide et al. |
| 6,239,389 B1 | 5/2001 | Allen et al. |
| 6,262,717 B1 | 7/2001 | Donohue et al. |
| 6,297,812 B1 * | 10/2001 | Ohara et al. ................. 345/173 |
| 6,323,846 B1 * | 11/2001 | Westerman et al. ......... 345/173 |
| 6,333,736 B1 | 12/2001 | Sandbach |
| 6,347,813 B1 * | 2/2002 | Star et al. ........................ 283/83 |
| 6,507,342 B1 * | 1/2003 | Hirayama ..................... 345/440 |
| 6,608,618 B2 * | 8/2003 | Wood et al. .................. 345/173 |
| 6,657,616 B2 * | 12/2003 | Sims ............................. 345/173 |
| 6,668,156 B2 * | 12/2003 | Lynch et al. ................. 434/317 |
| 6,954,199 B2 * | 10/2005 | Soto et al. .................... 345/173 |
| 2003/0103043 A1 * | 6/2003 | Mulligan et al. ............. 345/174 |

\* cited by examiner

*Reference Level*

*Peak Noise Level*

*Active Signal Level*

INTERACTIVE BOOK READING SYSTEM USING RF SCANNING CIRCUIT

This is a continuation of International Application No. PCT/US02/14745, filed May 10, 2002, which claims priority from U.S. Provisional Patent Application No. 60/290,444, filed May 11, 2001.

BACKGROUND OF THE INVENTION

Electronic early-learning readers are well known and have been employed for many years as teaching aids and entertainment devices. Many of the first readers developed used individual cards with words and/or graphics printed on each card. These readers use microcontrollers with software that map the contents of each card individually. The words or graphics printed on the card were associated with stored sounds and sound effects located in memory. Selection of a word or graphic printed on the card by the user would generate the associated audio sound from the interactive book reading system. The typical association would be for the reader to audibly pronounce the selected word or letter printed on the card.

Most of the first early-learning reading devices employed a panel array of membrane switches. The membrane switches which were arranged to match the content on the cards. The cards were placed on the reading device and a method of card identification was employed so that the reader knew which card was on the device. The card identification methods varied from optical card sensing through manual input. Manual input methods such as push button switches are most common in that they are less expensive to produce and reduce the complexity of the device. A common method of card or page identification is to select the card or page placed on the reader by pressing on a spot located on the card that is unique to that card. Selection of a word, letter or graphic printed on the card was accomplished by forcibly pressing down on the selected word, letter or graphic to close the membrane switch located under the card. The microprocessor would then produce the associated audio through an audible output device (e.g., speaker) in the housing of the reading device.

Many systems have been developed that use this basic technique of printed word, letter or graphic association with stored audio sound files. Texas Instruments produced many such membrane panel switch contact early-learning readers in the early 1980's. Worlds of Wonder produced such a book reading system in the mid 1980's that also used the membrane switch system. In some cases the individual cards were bound together to make small books that were placed on the interactive book reading system. The major drawback to the membrane switch system was that the printed cards or book pages needed to be very thin and flexible in order to allow the force of pressing on the card or book page to be transferred to the membrane switches located under the book. The target audience for these systems were usually toddlers and pre-school children who could not easily generate the required force to activate the membrane switches particularly when the cards were bound together to make books.

In order to overcome this drawback, new book reading systems were developed that used a handheld electronic stylus pointing pen that injected an electronic signal into a receiving panel located under the book. Sega introduced such a system in the early 1990's; other companies such as Leap Frog have also produced such handheld pen stylus readers. There are a number of major drawbacks to these pen systems. Specifically, the pens must be tethered to the system for various reasons including powering the electronics of the pen and so that the pen will not get lost. There are other drawbacks to the pen system such as the user cannot make simultaneous inputs as there is only one pointing device. Another drawback to the pen systems is that the user, typically very young, must be trained to use the pen whereas the finger selection method used by the membrane switch designs is more intuitive for the target audience.

BRIEF SUMMARY OF THE INVENTION

In one aspect, the present invention is an interactive book reading system responsive to a human finger presence. The system includes a radio frequency (RF) scanning circuit, a control circuit, a memory and an audible output device. The RF scanning circuit is configured to detect the presence of the human finger when the finger enters an RF field generated by the RF scanning circuit. The control circuit and memory are in communication with the RF scanning circuit. The memory stores a plurality of audible messages. The audible output device is also in communication with the control circuit. The audible device outputs at least one of the audible messages based on an analysis of the RF field performed by the control circuit when the finger enters the RF field.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
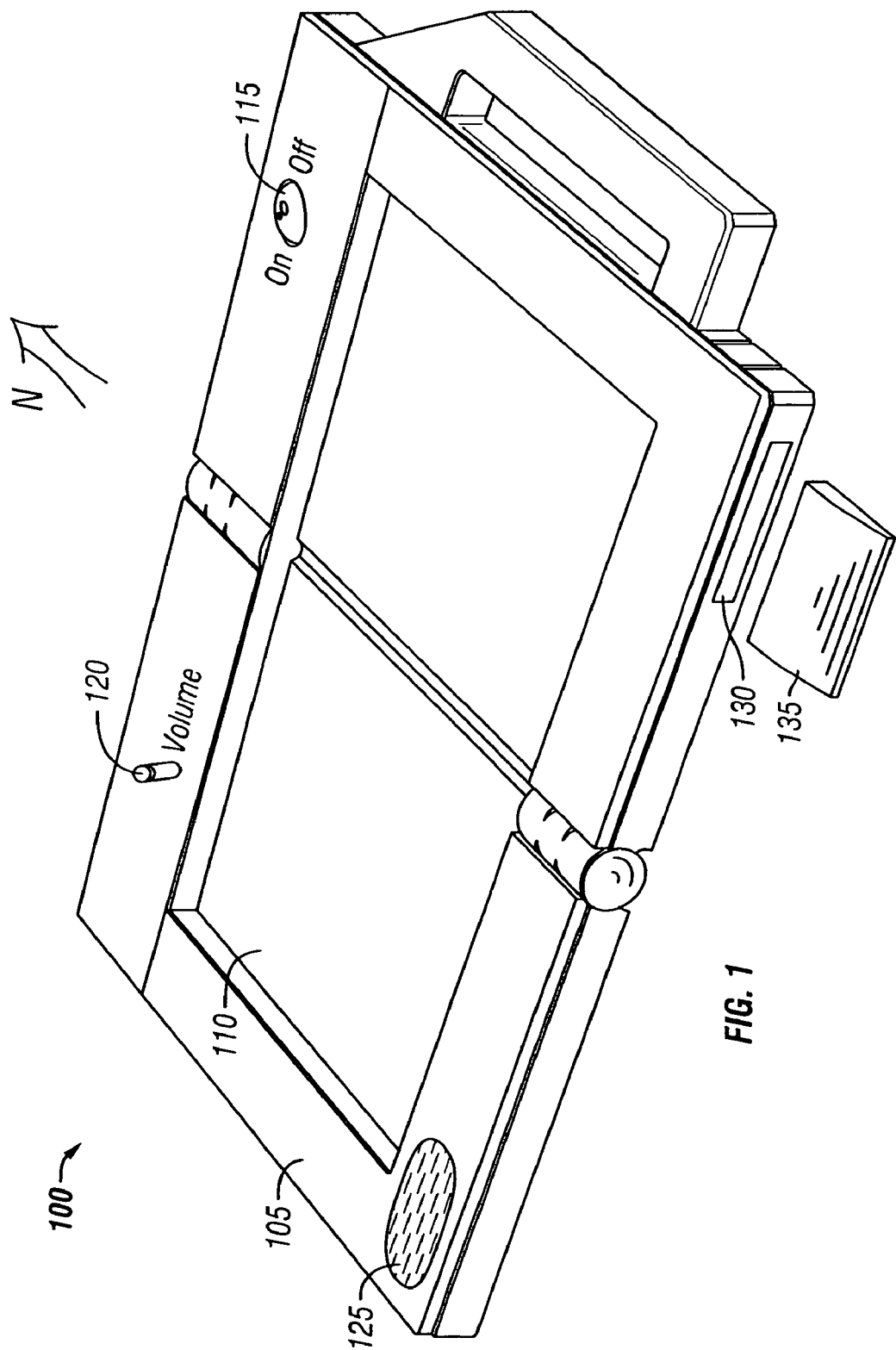
FIG. 1 is a perspective view of an interactive book reading system in accordance with the present invention.

The present invention relates to an interactive book reading system responsive to a human finger presence. The interactive book reading system includes an electromagnetic, in particular, a radio frequency (RF) scanning circuit configured to detect the presence of a human finger when the finger enters an RF field generated by the RF scanning circuit. The interactive book reading system produces an audible sound in response to a finger touch on a page of a book placed on the interactive book reading system within the RF field. This early learning device may be targeted to non-reading children as a reading aid and entertainment system. Specifically, books and software associated with each book are used in the interactive book reading system simultaneously. The user places a book on the interactive book reading system and then inserts a ROM cartridge into the interactive book reading system. The interactive book reading system has a non-contact finger sensor that can sense the location of a finger when it is placed within the active finger sensor area of the RF scanning circuit.

The finger sensor area is matched to the size of the books placed on the interactive book reading system. For instance if the books are 12"×8" when open and lying flat then the active finger sensor is a flat panel that is approximately 12"×8". The non-contact finger sensor of the interactive book reading system can sense the presence of a finger at a distance of over ¼" from the planar surface of the sensor. This z resolution allows the sensor to detect the presence of a finger through a book that is up to at least ¼" thick. The finger sensor has an x and y resolution fine enough to select every word or graphic that is printed on the book.

The software within the ROM cartridge for any specific book contains information to produce sounds and sound effects associated with graphics and printed words within the book. The x and y coordinates of any word or graphic on all pages of the book are mapped into the ROM cartridge. Therefore, selecting any text or graphic by simply touching it produces the audio output associated with the specifically selected text or graphic. This information is organized in a page-by-page architecture. The user of the system places the book on the interactive book reading system, inserts the ROM cartridge for that book into the cartridge slot of the interactive book reading system and selects the page of the book by touching a page number printed on each page of the book, the page numbers being printed at different locations on the page. The interactive book reading system can then produce an appropriate audio output in response to a finger touch on any word or graphic on that page of the book. This open architecture allows for infinite books and software to be used in the interactive book reading system.

The interactive book reading system reads every finger placed within the sensor. A user can therefore select multiple points on the page. This is particularly useful when associating two points on a given page, such as, the printed word "apple" and the graphic of an "apple". Touching both simultaneously can produce a positive audio output from the interactive book reading system. This ability is very helpful for teaching associated learning.

The ability to sense multiple inputs can also be misleading for the book reading system in that frequently a user may place the whole hand on the book with an extended finger to select a word or icon on the page. The interactive book reading system sees the whole hand or any part of the body within the sensor area. To compensate for this, the system must select the probable input before making an associated audio output. The present invention looks at the full array inputs and can determine the selected input by applying any of a number of algorithms on the input signature to determine the appropriate input. The first algorithm applied when more than one input is sensed is called the most northern point algorithm. This most northern point algorithm looks for the input that is closest to the top of the book, the top of the book being associated with north ("N" in FIG. 1), the left, right and bottom being associated with west, east and south respectively. Assuming that the user in sitting in front of the unit and using a hand to select the word or graphic, it can be assumed that the most northern point is associated with the pointing finger of the hand. In the event the book-reading sensor cannot select a lone most northern point then the next algorithm applied looks for a pointing finger within a cluster of inputs generated by placing the full hand on the interactive book reading system. A hand with an extended finger creates a cluster input that has a single selected point surrounded on three sides by non-selected points protruding from the cluster. This algorithm is useful in distinguishing a user placing the hand on the interactive book reading system in a direction other than the pointer finger pointing north. The aforementioned algorithms assume that the user places a hand on the book with the pointing finger extended and the rest of the fingers in a closed position with respect to the palm.

The interactive book reading system also looks to see if there are multiple hands placed on the book as it is possible for the user to inadvertently place more than one hand on the book. In the event that the sensor of the interactive book reading system sees two hands placed on the sensor, it can look to see if either input is a lone input or a clearly defined most northern point and, if so, it selects this input. If the book reading system cannot determine with reasonable accuracy the likely input, it generates an audio output to direct the user to use "one finger at a time" or any other appropriate statement.

Referring to the drawings in detail, where like numerals indicate like elements throughout, a first preferred embodiment of the interactive book reading system, generally designated 100, is depicted in accordance with the present invention. Referring more specifically to FIG. 1, there is shown an interactive book reading system 100 without a book inserted therein. The interactive book reading system 100 contains a support structure or housing 105 having at least one recessed area 110 (e.g., a book well) in which a printed book is inserted, an on/off control 115 and volume control 120, a speaker 125, and a ROM slot 130 for inserting and removing a ROM cartridge 135.

Figure 2:
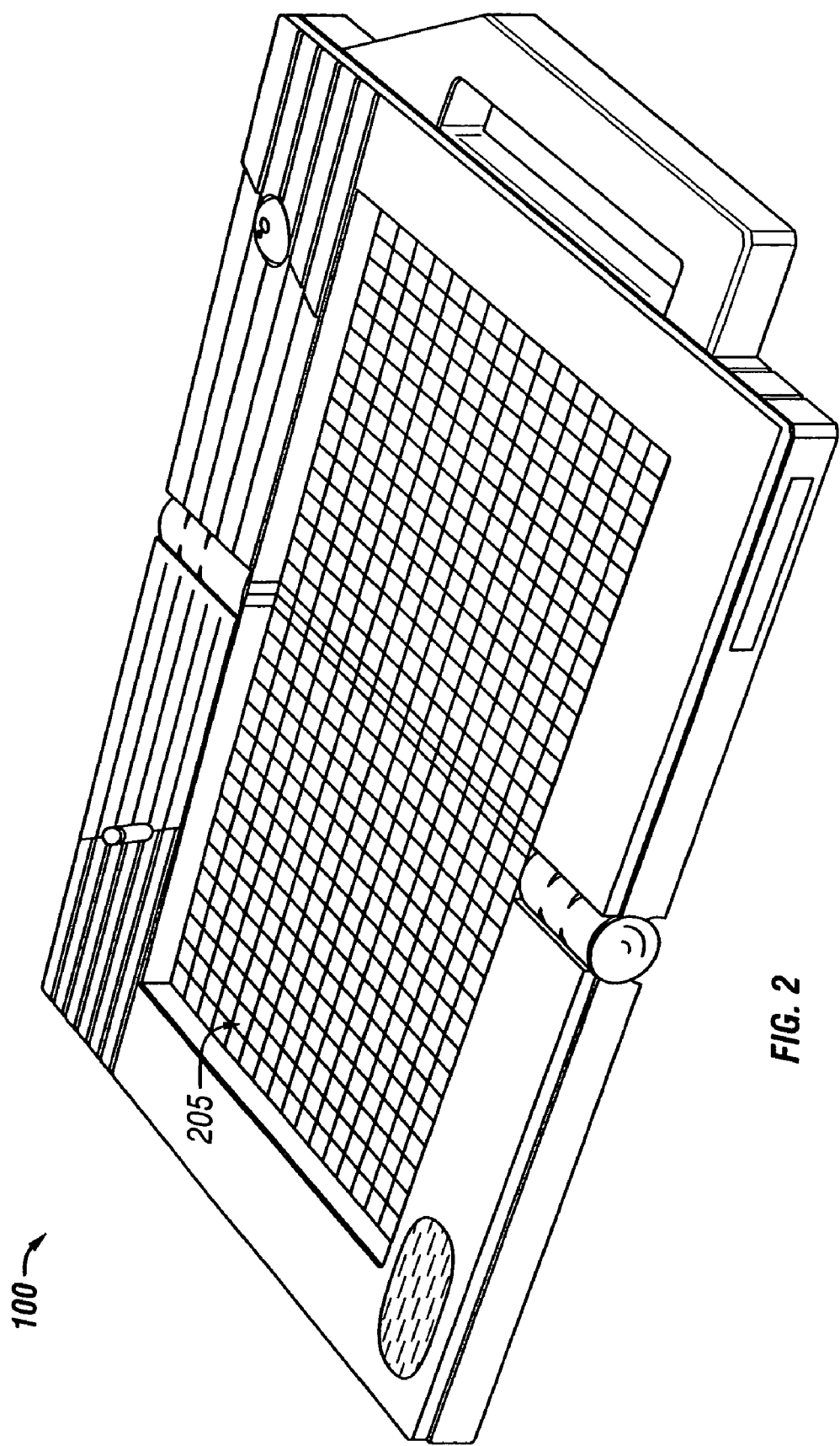
FIG. 2 is a perspective view of a schematic of the matrix of the interactive book reading system of FIG. 1.

FIG. 2 shows a matrix 205 (also referred to as a cross-point sensor array or proximity sensor array) located just under the recessed area 110 of the interactive book reading system 100. The matrix 205 is used to sense the location of a finger(s) or other human digit(s) that enters an RF field generated by the present invention. The matrix 205 shown has a resolution of sixteen lines vertical and twenty-four lines horizontal. The matrix consists of conductive lines arranged as a plurality of spaced apart column conductive lines (also referred to as vertical grid lines) and a plurality of spaced apart row conductive lines (also referred to as horizontal grid lines) transverse to the plurality of column conductive lines. Referring to sets of lines as "rows" or "columns" is a convenience. "Rows" may run north-south and "columns" may be perpendicular (or otherwise transverse) to such "rows". The column conductive lines and the row conductive lines may be separated by an electrically insulative plastic sheet such as a Mylar sheet with printed conductive lines forming the array. The column conductive lines may be printed on the top of the Mylar sheet and the row conductive lines may be printed on the bottom of the sheet to provide electrical isolation. The gap between the column and row conductive line planes is relatively inconsequential, and thus the conductive lines may be etched on the top and bottom of standard printed circuit boards. The most important element of the matrix design is to have the column and row conductive lines be as narrow as possible to reduce the capacitive coupling effect of the traces. The lower capacitive coupling allows the matrix 205 to see changes in the radiated pattern of the RF field as far away as four inches. An exemplary embodiment of the design limits the column or z resolution of the device to approximately 0.200". The array resolution or number of row and column conductive lines can be changed without effecting the operation of the matrix 205. The exemplary embodiment uses a 6" by 9" matrix 205 with row and column conductive lines on 0.375" centers. This configuration provides a uniform matrix of sixteen x twenty-four lines.

The matrix 205 works by exciting the one set of lines, such as the vertical column lines sequentially from one through sixteen with a radio signal of approximately 100 kHz at 18 vac and then reading the coupled radio signal on the horizontal row lines of the matrix 205. The remaining set of lines, the horizontal row lines are scanned sequentially from one through twenty-four during each excitation of one vertical column line. In this manner, each cross-point of the matrix is measured individually. The measured value of each cross-point is stored in RAM memory of a control circuit. When a finger or hand is present over the matrix 205, the value of the coupled RF signal is reduced at the location of the finger or hand over individual cross-points. By comparing successive full scans performed by the matrix 205 for the presence of a finger, the precise location of the finger can be determined.

Figure 3:
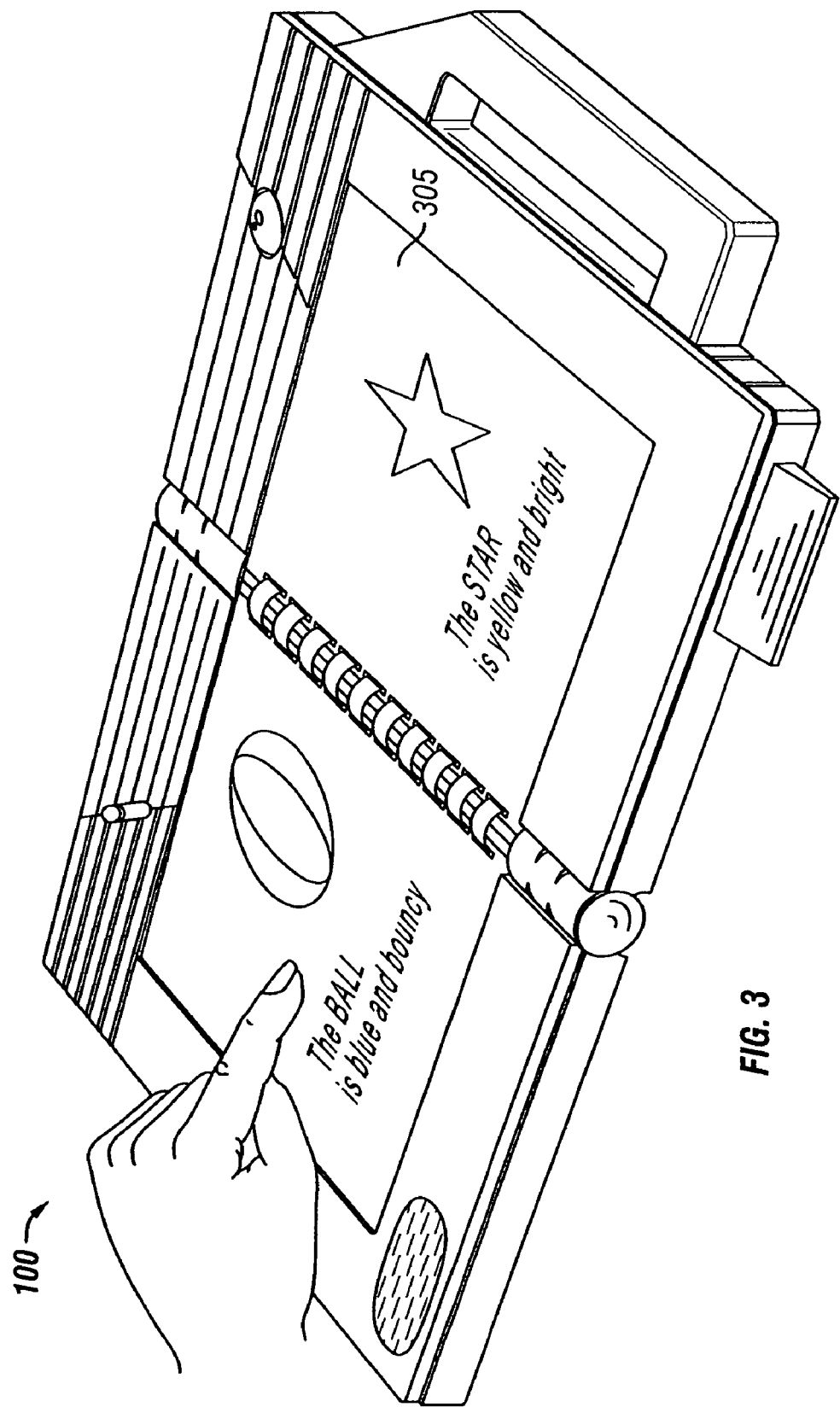
FIG. 3 is a perspective view of the interactive book reading system of FIG. 1 with a book in a book well of the book reading system.

FIG. 3 shows the interactive book reading system 100 with a book placed on the matrix of the system and a user selecting the work "Ball" with an extended pointing finger. The operation of the interactive book reading system 100 allows a user to select any active area on the page of the book by simply pointing to the selected area of the page with a finger. Upon selection of this active area, speaker 125 of the interactive book reading system 100 outputs an audible message responsive to this selection. By way of example, when the finger touches the word "ball", the interactive book reading system 100 produces a spoken audio output "ball" from the speaker 125. The audible message is generated in direct response to the user touching the word "ball". Different audible messages would be generated if the user touched other areas of the page, for example touching the word "blue" would generate an audible message "blue". Touching the ball graphic on the page could produce a sound of a bouncing ball. Touching any areas of the book page that do not have text or graphics could either generate a generic sound of a single bell ring to signify that there is no audio associated with this area, a generic spoken audio output such as "try again" or the input selection could simply be ignored. The interactive book reading system 100 can therefore be used to read the book, create sound effects associated with graphics on the book or any other activity programmed to be responsive to a finger touch.

Figure 4:
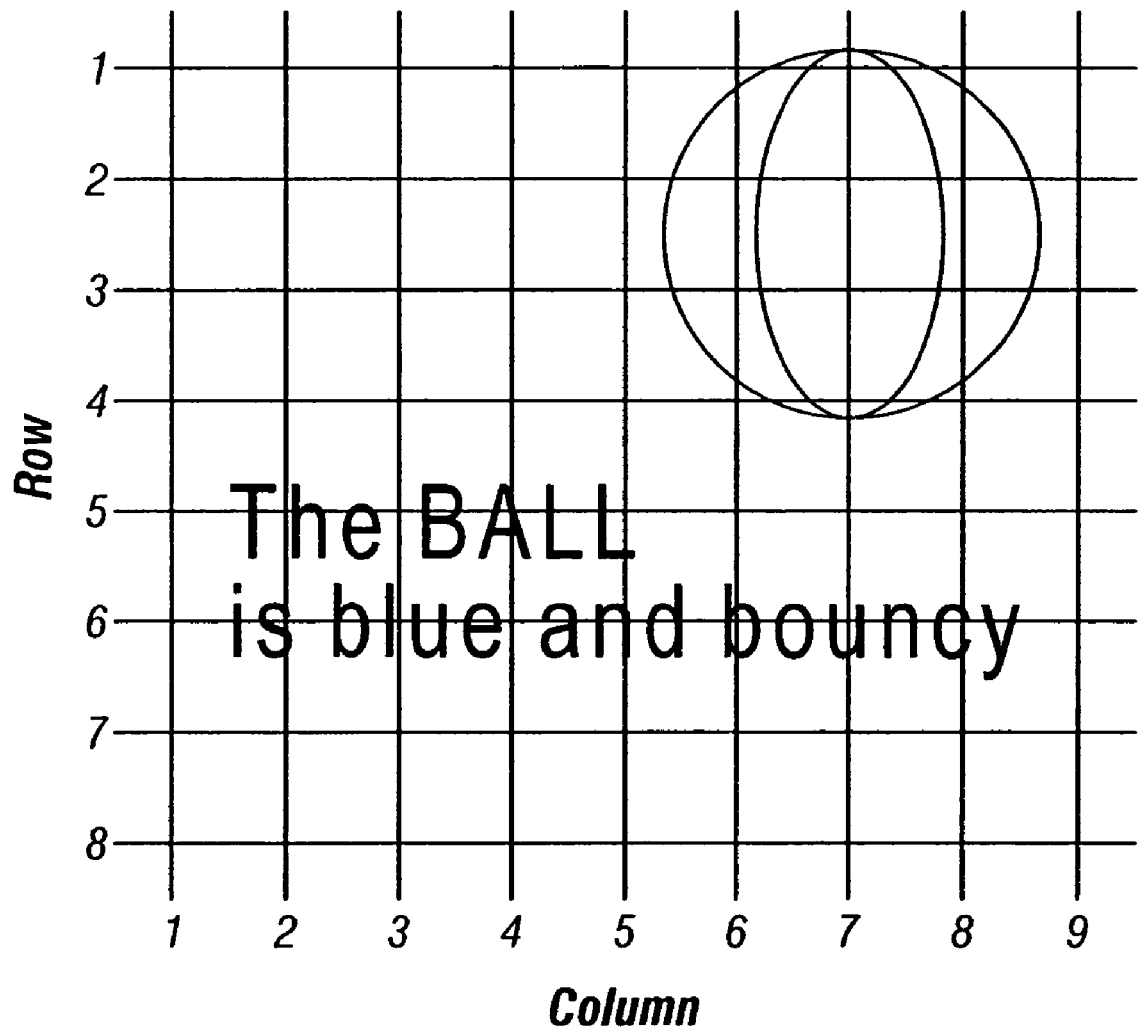
FIG. 4 is a plan view of a portion of the book placed on the matrix of FIG. 3.
Figure 5A:
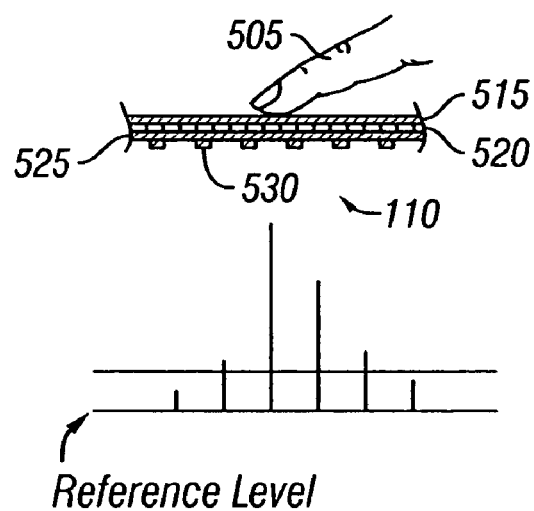
FIG. 5 is cross-sectional of several views of a portion of the matrix of FIG. 3 with the book having a varying number of pages placed thereon.
Figure 5B:
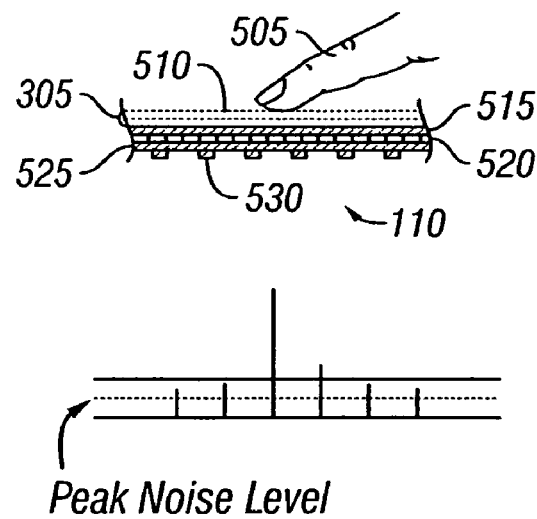
Figure 5C:
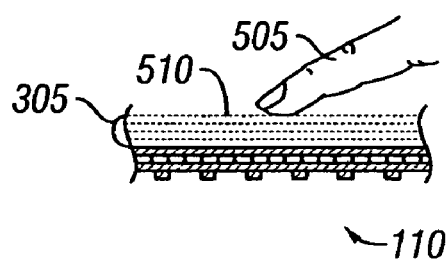
Figure 5C:
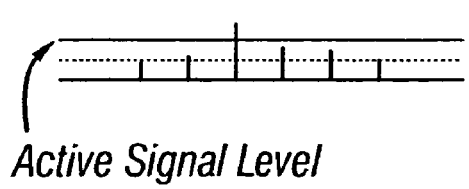

FIG. 4 shows an image of words and graphics printed on a page superimposed on an eight row by nine column matrix. It can readily be seen that each word can be mapped to an x and y coordinate of the matrix. For instance, the word "ball" is located at R5, C4 and R5, C5 of the matrix. This location map is stored in ROM along with the associated audible message that is played when each cross-point is selected.

FIG. 5 shows three cross-sections of the matrix 205: 5A, 5B and 5C. The cross-section drawings show from top to bottom a finger 505, pages 510 of a book 305 (at various thickness), a plastic spacer 515, a plurality of spaced apart column (vertical) traces 520, a non-conductive (e.g. Mylar) sheet 525 and a plurality of spaced apart row (horizontal) traces 530 transverse to the plurality of column traces 520. The non-conductive sheet 525 separates the column traces 520 from the row traces 530.

The plastic spacer 515 is approximately 0.060" to 0.100" and is placed on top of the matrix 205 to act as an insulator so that pages 510 of the book 305 are separated from the matrix 205 by at least this amount. The function of the spacer 515 is to reduce the effect of moisture in the pages 510 of the book 305 from affecting the sensitivity of the matrix 205. The matrix 205 is highly affected by moisture in the RF field generated by the matrix 205. By separating the pages 510 of the book 305 from the matrix 205 by the thickness of the plastic spacer 515, the affect of moisture on the matrix 205 is greatly reduced. As stated previously, the width and thickness of the column traces 520 (vertical columns) and row traces 530 (horizontal rows) should be kept to a minimum to reduce the capacitive effect of each of the cross-points. The thickness and composition of the non-conductive sheet 525 has minimal affect on the operation of the matrix 205.

Each cross-section shows the matrix 205 with various thickness of paper placed thereon. Below each cross-section is a histogram of the differential signal generated by each cross-point when a finger 505 is placed on the pages that are over the matrix 205. It can be seen that the closer the finger 505 is to the matrix 205, the higher the differential signal generated by each of the cross-points. The histogram charts show the reference level of each cross-point, the peak noise level and the active signal threshold level. The reference level is the average signal level generated by each of the cross-points. The peak noise level is the maximum random noise signal that is generated at each cross-point. The active signal threshold level is the signal level that a cross-point must generate to indicate a finger touch. It can be seen particularly in 5A that when any portion of the finger 505 is close to the matrix 205, the cross-point generates an active signal. It can also be seen that the cross-point with the closest finger 505 generates the highest signal level.

Figure 6:
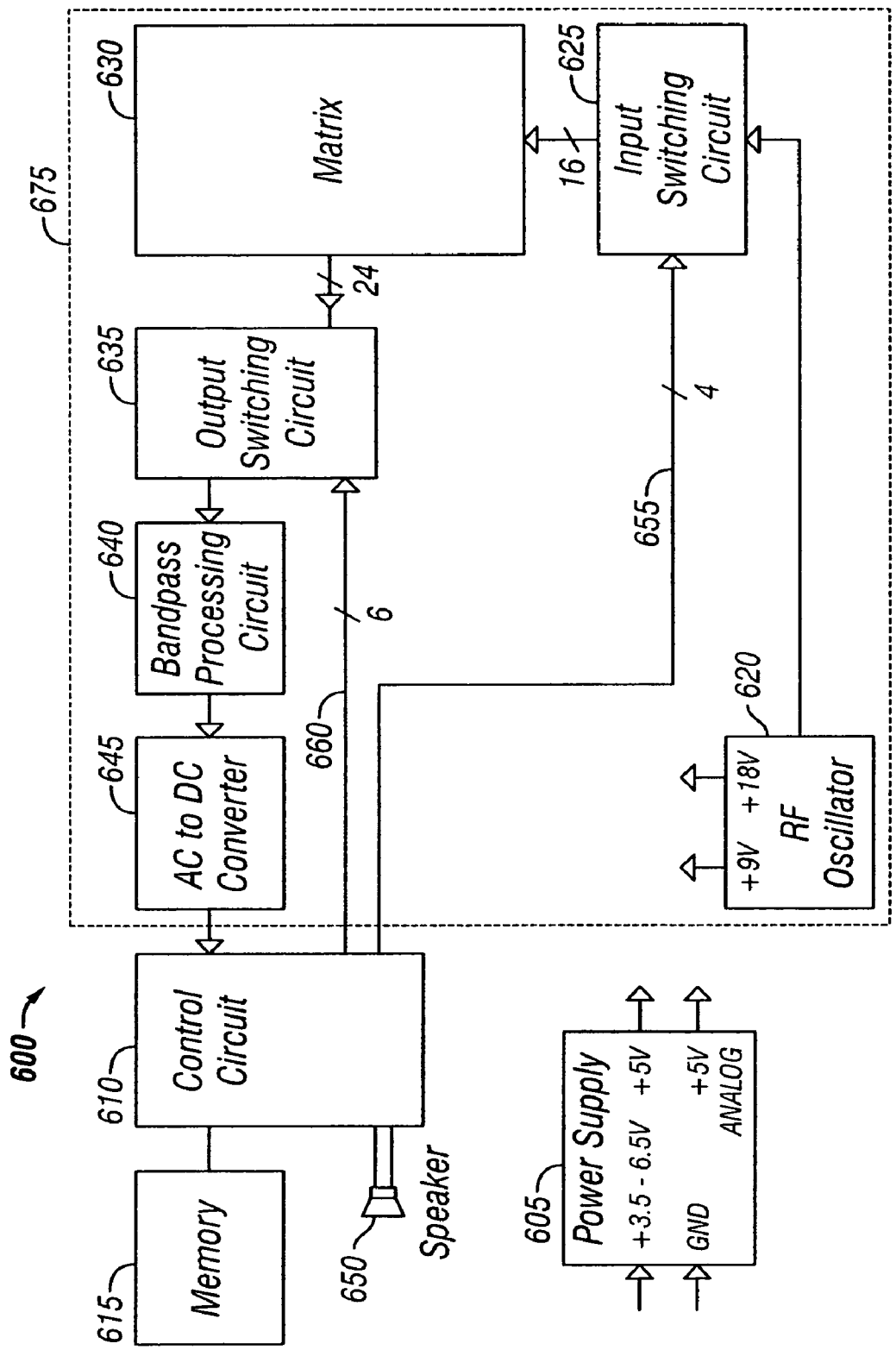
FIG. 6 is a schematic block diagram of the electronics of the interactive book reading system which includes an RF scanning circuit in accordance with the present invention.

FIG. 6 shows a block diagram of an interactive book reading system 600 in accordance with the exemplary embodiment of the present invention. The interactive book reading system 600 includes a power supply 605 which converts +3.5 VDC to +6.5 VDC battery power into regulated power levels of +5 VDC and analog +5 VDC. The interactive book reading system 600 also includes a control circuit 610 which may include a general-purpose microcontroller, such as Sunplus™ part # SPCE-500A, or the like. The interactive book reading system 600 also includes a memory 615 which is in communication with the control circuit 610 and may include a general-purpose mask ROM. Memory 615 also contains program and a bus extender that interfaces the control circuit 610 to an external ROM (e.g. see ROM cartridge (memory) 135 in FIG. 1). It should be noted that the Sunplus™ controller part # SPCE-500A contains 512K bytes of program ROM. The exemplary embodiment uses internal and/or external ROM. When no external ROM is present, internal ROM is active. When external ROM is present, the control circuit 610 can use internal and/or external ROM. Memory 615 stores a plurality of audible messages. The interactive book reading system 600 also includes an audible output device 650 in communication with the control circuit 610.

The interactive book reading system 600 further includes an RF scanning circuit 675 which is in communication with the control circuit 610. The RF scanning circuit 675 includes an input switching circuit 625, an RF oscillator 620, a matrix 630, an AC to DC converter 645, a bandpass processing circuit 640, and an output switching circuit 635. The input switching circuit 625 is in communication with the control circuit 610, the RF oscillator 620 and the column conductive lines of the matrix 630. The RF oscillator 620 is in communication with the input switching circuit 625. The output switching circuit 635 is in communication with the control circuit 610 and the row conductive lines of the matrix 630. The bandpass processing circuit 640 is in communication with the control circuit 610 via the AC/DC converter 645, and with the matrix 630 via the output switching circuit 635.

The RF oscillator 620 generates a stable AC voltage 100 kHz sine wave. The RF oscillator 620 is a current mode power signal generator, which generates a sine wave at approximately 18 VAC. This high voltage sine wave is presented to matrix 630 through the input switching circuit 625. The RF oscillator 620 also generates stable +18 VDC and +9 VDC voltage supplies. The invention is not limited to these values.

Figure 9:
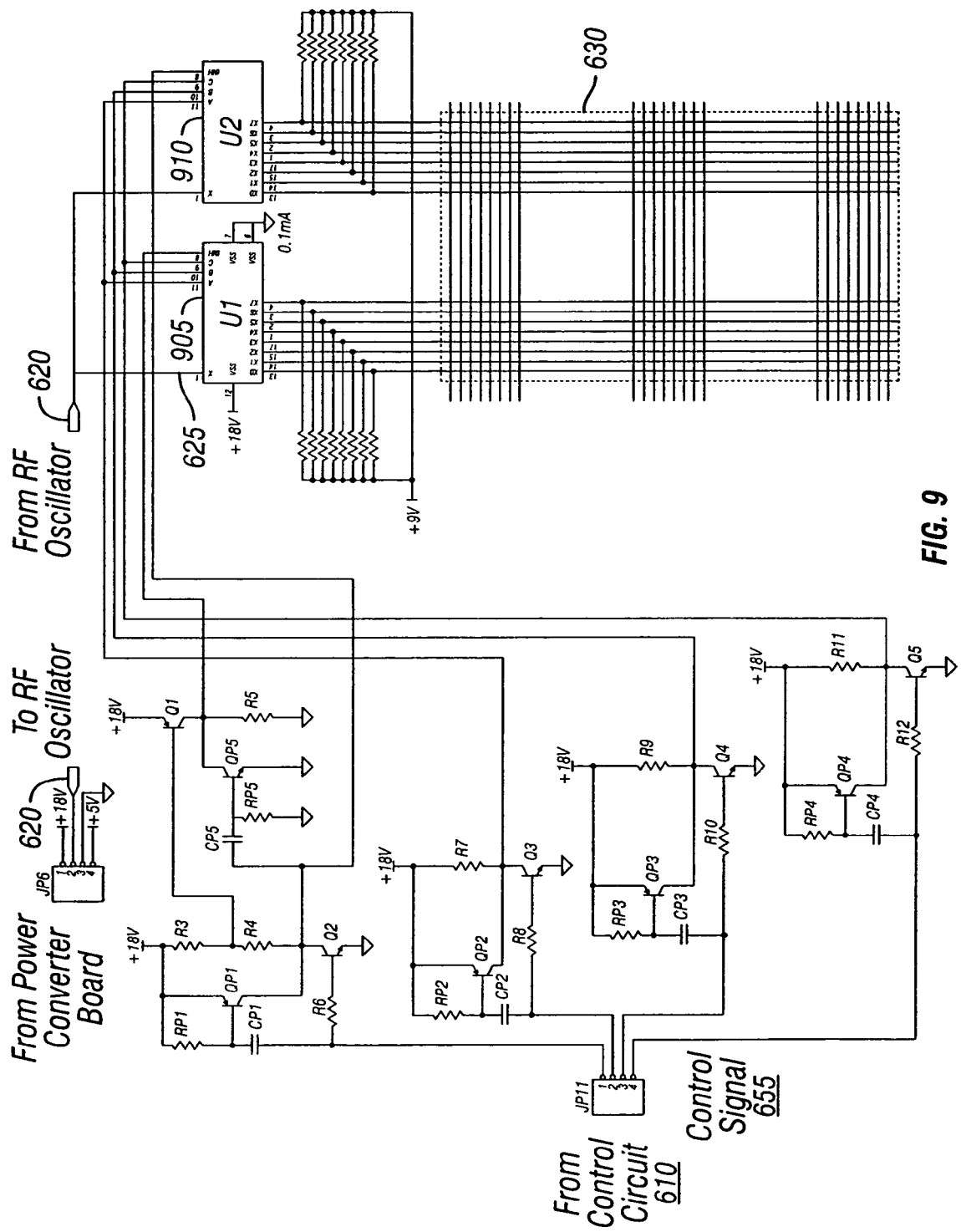
FIG. 9 is a circuit diagram of an input switching circuit and matrix of the RF scanning circuit of FIG. 6.

As shown in FIG. 9, the input switching operation is performed by input switching circuit 625 which includes 2, CD4051, 8 channel analog multiplexers 905, 910. The input switching circuit 625 receives the RF signal generated by the RF oscillator 620 and sequentially routes the RF signal generated by the RF oscillator 620 to each of the column conductive lines of the matrix 630 according to a predetermined input sequence as directed by a first control signal 655 outputted by control circuit 610 and received by input switching circuit 625. The control signal 655 instructs the input switching circuit 625 to select one of 16 column conductive lines sequentially through four select lines.

The matrix 630 is organized in a sixteen column by twenty-four row configuration. The array size is 6"×9" with line spacing of 0.375" on center. The array construction uses a Mylar sheet substrate with printed conductive horizontal (row) and vertical (column) lines. Coupled RF signals received from a specific column conductive line by the row conductive lines are outputted according to a predetermined output sequence as directed by a second control signal 660 outputted by control circuit 610 and received by output switching circuit 635. The output switching circuit 635 selects one of the twenty-four rows and presents this output to bandpass processing circuit 640. The control circuit 610 outputs a control signal 660 to select one of twenty-four rows sequentially through six select lines.

Figure 10:
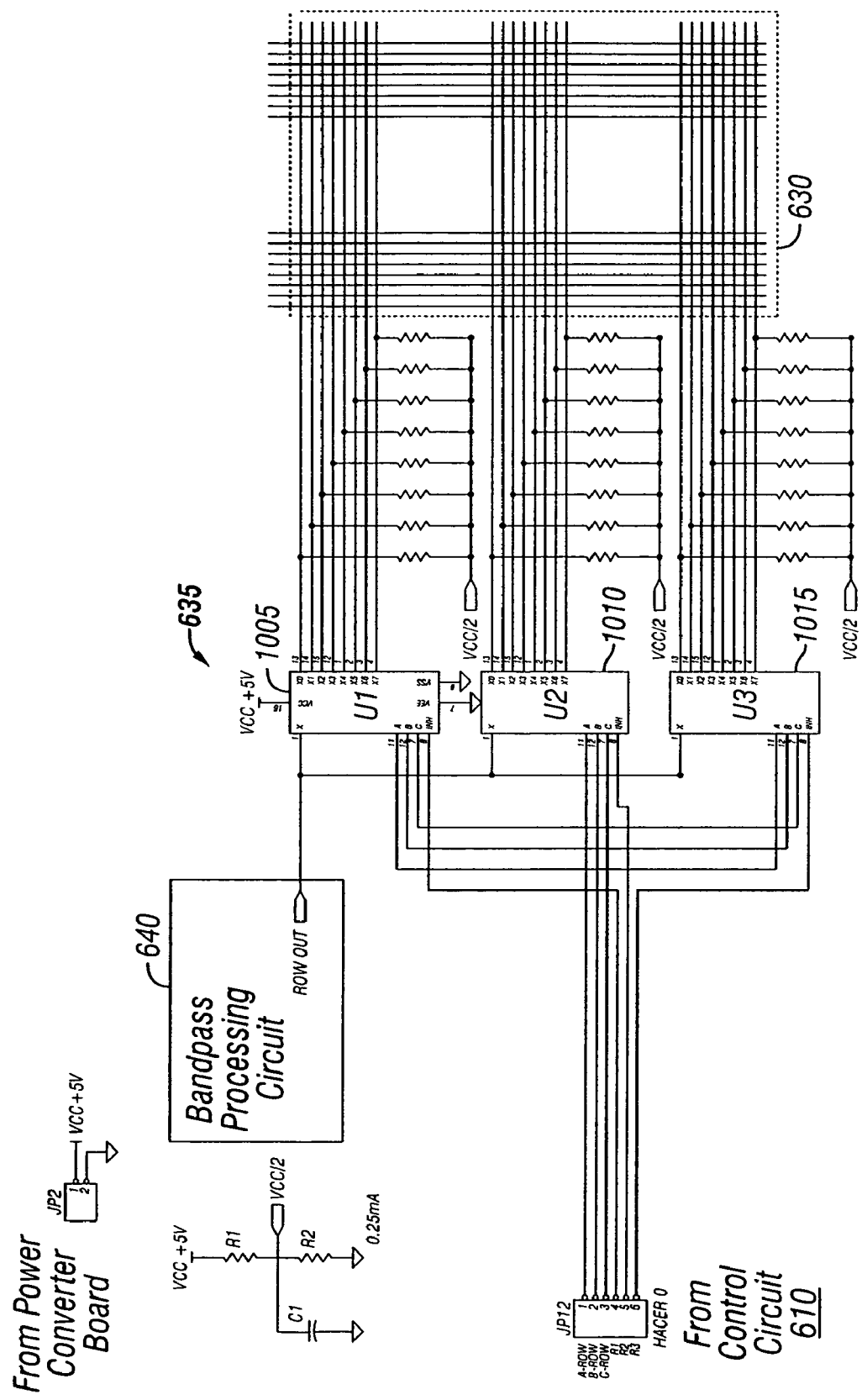
FIG. 10 is a circuit diagram of an output switching circuit and the matrix of the RF scanning circuit of FIG. 6.

As shown in FIG. 10, the output switching operation is performed by output switching circuit 635 which includes three, 74HC4051, eight channel analog demultiplexers 1005, 1010, 1015. The output switching circuit 635 runs at a synchronized rate that is twenty-four times faster than the input switching circuit 625. Therefore, when each column conductive line is selected by the input switching circuit 625, the output switching circuit 635 individually and sequentially selects one of twenty-four rows until the entire array has been selected.

The bandpass processing circuit 640 includes a 100 kHz bandpass amplifier and bandpass filter. The bandpass processing circuit 640 has a very selective low noise gain of 500 at approximately 100 kHz. This is necessary because the amplitude of the coupled RF signals received by bandpass processing circuit 640 from output switching circuit 635 is very small, typically less than 5 millivolts (MV). The bandpass processing circuit 640 amplifies and filters the coupled RF signals, and routes the amplified and filtered coupled RF signals to the control circuit 610 for analysis.

The RF scanning circuit 675 also includes an AC to DC converter 645. The AC to DC converter 645 is in communication with the control circuit 610 and the bandpass processing circuit 640. The AC to DC converter 645 transforms the peak of the amplified and filtered coupled RF signals received from bandpass processing circuit 640 to DC level signals and routed to control circuit 610. The representative DC level of each cross-point is stored in a random access memory (RAM) of the control circuit 610 to determine the presence or absence of a finger over each cross-point.

Figure 7:
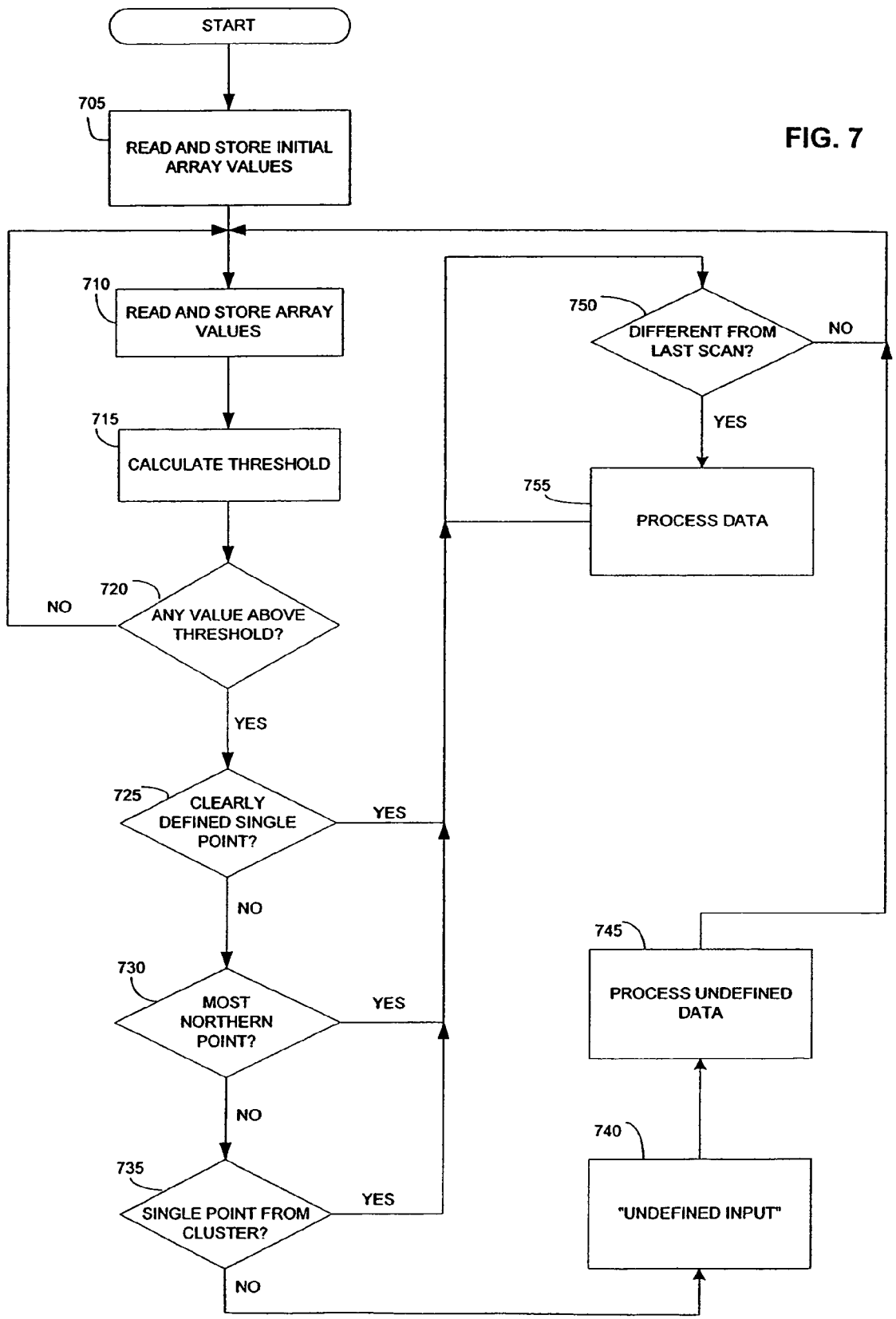
FIG. 7 is a flow chart of the operations performed by the electronics of the interactive book reading system of FIG. 6.

FIG. 7 is a flowchart representing the operations performed by control circuit 610 to sense the proximity of a human finger when it enters an RF field generated by RF scanning circuit 675 of the interactive book reading system 600. Initially, the control circuit 610 reads and stores all of the values of the matrix 630 without a human presence in the RF field to obtain a reference value for each cross-point (step 705). Successive scans of the matrix 630 are compared to the reference values to determine the proximity of a human finger or other digit.

One method implemented to ensure that the initial reference scan operation is done without a human digit penetrating the RF field is to have the control circuit 610 take the initial readings when an interactive book reading system incorporating the present invention is in a "closed" position. FIG. 1 shows a representative embodiment of the interactive book reading system with a center hinge. A switch is activated when the hinge is closed, thus allowing the control circuit 610 to know when the interactive book reading system is in the closed position allowing error free initialization. There are other techniques that may be employed to ensure an error-free reference scan, such as reading the initial cross-point values during manufacturing the interactive book reading system and storing them in Flash ROM.

After the initial values are stored, the matrix 630 is continually scanned and the results are compared with the reference values (step 710). If any individual cross-point values have a differential value from the reference values that are greater than a predetermined amount, the control circuit 610 determines if this difference value is high enough to indicate the presence of a valid human digit input. To make this determination, the control circuit 610 calculates a threshold value based on the highest difference value of each row conductive line scanned (step 715). The highest value of each row conductive line is summed together and divided by the number of row conductive lines to achieve this dynamic threshold value. The threshold value is dynamic for each scan due to the fact that the human digit can be as far away as four inches, which can influence the readings outputted by matrix 630. This dynamic threshold level ensures that the algorithm does not see inadvertent inputs from hands or body parts hovering above the matrix 630. Once the value is calculated, the control circuit 610 looks to see if any cross-point values are above the threshold (step 720). If so, the algorithm then looks at the signature of the inputs to determine which cross-point has been activated.

The matrix 630 can clearly see a single point activation using an extended pointer finger (i.e., a human digit) with cross-points on 0.375" centers. One finger makes one cross-point differential value substantially higher than all others, thus eliminating the need to find the centroid of input as would be required if the array resolution was substantially smaller that a typical finger pad. If a single point is seen (step 725), then the control circuit 610 analyzes the coordinates of the input and plays a corresponding audio file retrieved from memory 615 that is associated with this input. If, on the other hand, the input signature is not a clearly defined single input, then the control circuit 610 looks at the input signature from any number of algorithms to determine the correct coordinate.

One algorithm looks to see if there is a defined most northern point (step 730). North ("N") is defined as the top of the interactive book reading system as shown in FIG. 1. From testing it was noted that in many cases a user would place the full hand on the matrix 630 with the pointer finger extended to the word, letter or graphic being selected. As the interactive book reading system is designed for the user to sit in front of the system, the condition of a finger pointing north is common. When a clearly defined north point is seen, the coordinate for this point is processed by the control circuit 610.

If a most northern point cannot be resolved, then the algorithm looks to see if there is a clearly defined single point protruding from a cluster of inputs (step 735). This condition indicates that the user may be pointing from an off angle with respect to the book or a second user such as a parent sitting off to the side of in front of the interactive book reading system is making the selection. In this case, the control circuit 610 processes the lone protruding point from the cluster of inputs (steps 750, 755).

If none of the above mentioned conditions holds true, then the control circuit 610 analyzes undefined input data derived from an undefined input (steps 740, 745) and prompts the user to use one finger to make the selection. This algorithm is designed to accept real world selection parameters of the target audience using a finger to select an input on a very sensitive finger-reading device.

Figure 8:
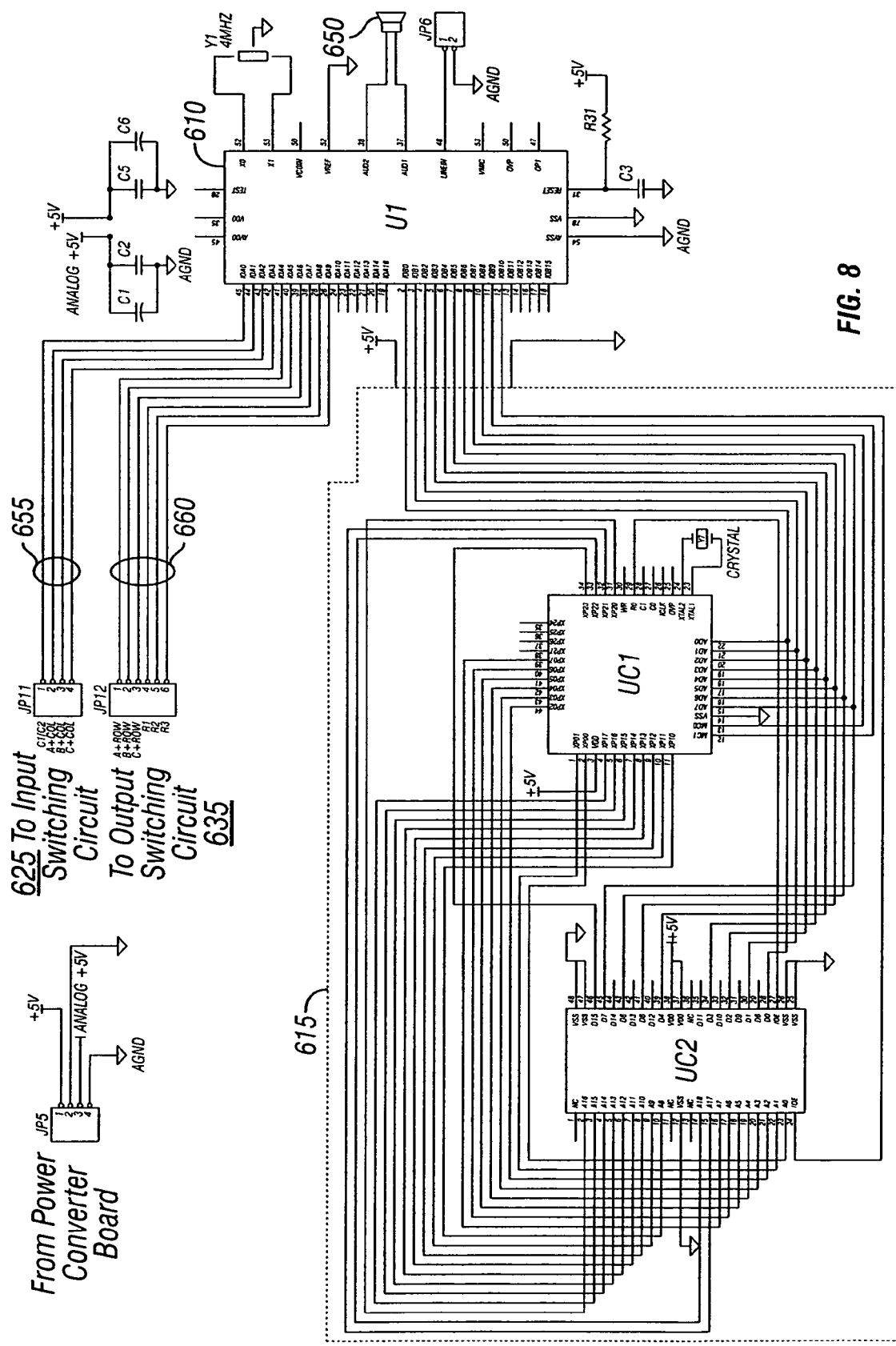
FIG. 8 is a circuit diagram of the control circuit and a memory shown in FIG. 6.

FIG. 8 shows a schematic of the interconnections between the control circuit 610 and memory 615 (which may include ROM cartridge 135 which is inserted and removed from ROM slot 130). The control circuit 610 sends control signal 655 to input switching circuit 625 via connector JP11. The control circuit 610 also sends control signal 660 to output switching circuit 635 via connector JP12.

Figure 11:
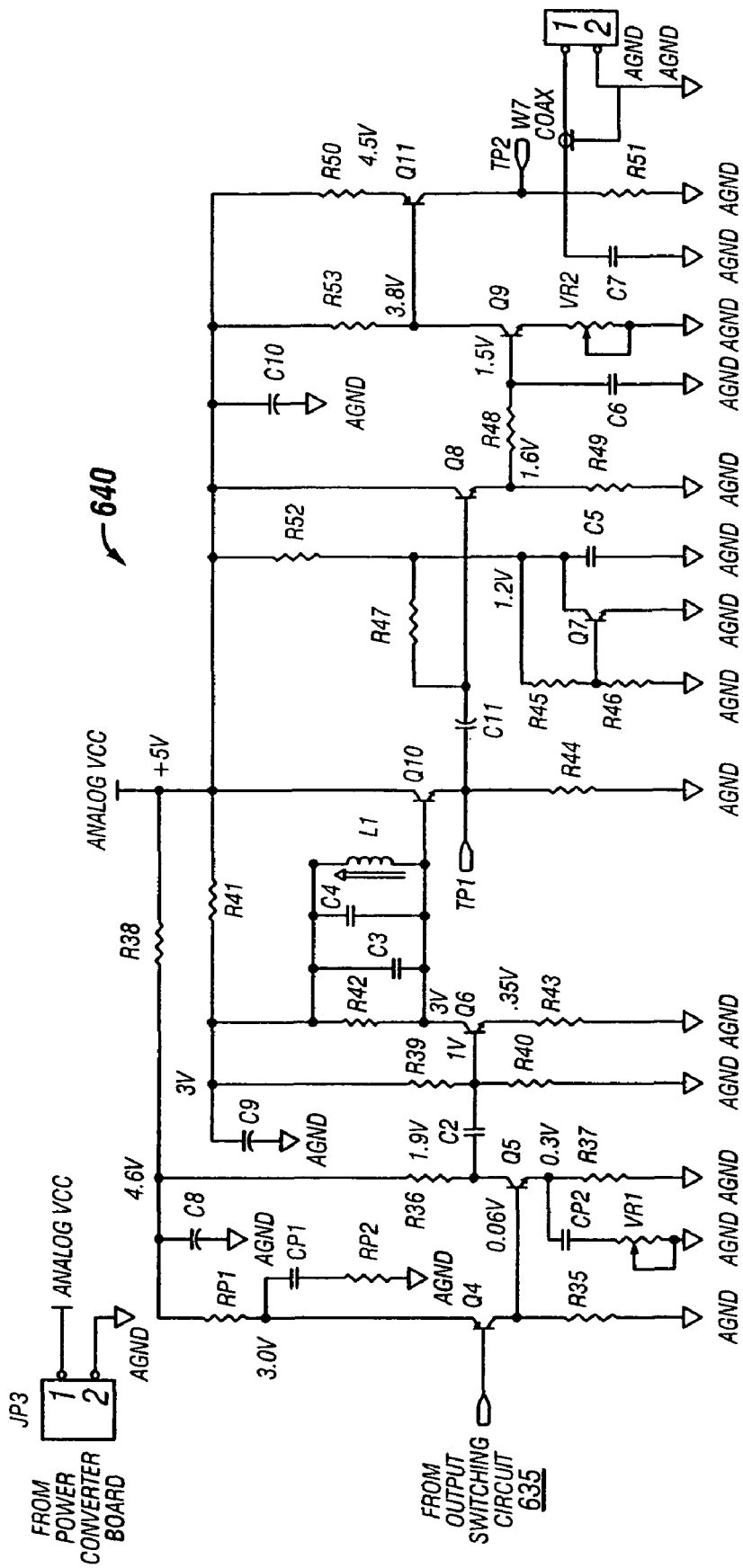
FIG. 11 is a circuit diagram of a bandpass processing circuit of the circuit of the RF scanning circuit of FIG. 6.

FIG. 11 shows a schematic of bandpass processing circuit 640 according to the present invention. The bandpass processing circuit includes a filter section and an amplifier section. The coupled RF signals on the row conductive lines of matrix 630 have a very small amplitude, (e.g., 5 mv or less), and the matrix 630 is a high impedance source. An overall gain of 500 at approximately 100 kHz and an input impedance of approximately 500K ohms is desired for the amplifier section. This is a gain bandwidth product of 50 MHz with a low noise requirement. Very few op-amps can do this, and those that can are very expensive. For these reasons, a discrete transistor design must be used. The number of transistors must be kept to a minimum to keep the noise factor low.

An input impedance buffer including Q4 has a 500K ohm input impedance and is designed to work with the 2.5V bias coming from the matrix 630. Resistor RP1 sets the DC bias, and RP2 sets the AC gain to about 3. The R38 and C8 combination isolate any power rail noise from getting to Q4 and Q5.

The first gain stage includes transistor Q5 which gives the first stage of gain at about 6.5. Adjustment potentiometer VR1 sets the overall AC gain for the amplifier section. The capacitors CP1 and CP2 allow gain at the 100 kHz frequency to amplify and cause a lower frequency roll off starting at around 70 kHz to keep unwanted frequencies out of the amplifier. The 60 Hz hum and it's harmonics are the largest signals to avoid and can be 1000 times larger than the desired signals. The DC level at the collector of Q5 vary with component values and temperature. The use of R38 limits these variations to +/−0.5 V and C2 is used to isolate these variations from the next stage.

The filter section uses an L-C bandpass filter to get high gain, moderate Q, and very low noise. This filter must also be adjustable by a ferrite slug in the potentiometer core, L1. The capacitors C4 and C3 give a coarse and fine adjustment of the resonant frequency respectively. The resistor R42 kills the Q of the circuit to make it less sensitive to variances in the 100 kHz source frequency. It also limits the AC gain to about four.

Impedance Buffer Q10 is a transistor that provides a high drive capability at TP1 and also prevents loading of the L-C tank circuit L1, C3, and C4. The DC bias of Q6 and Q10 is set by R39 and R40 and is unaffected by other sections. The signal at the emitter of Q10 is set to an average of 2.4V peak-to-peak (P-P) of 100 kHz sine wave by VR1.

The AC to DC converter 645 operates at a frequency of 100 kHz and includes transistors Q7, Q8, Q9, and Q11. Once the coupled RF signals have been amplified and filtered, it is necessary to transform the amplified and filtered RF signals to DC level signals. The amplitude of the DC level signals vary as the cross-points of the matrix 630 are scanned. Thus, the AC to DC converter 645 must have a rapid response. The DC output of the AC to DC converter tracks a positive amplitude change within several cycles, and tracks a negative amplitude change in about ten cycles of 100 kHz.

A TempCo bias circuit includes transistor Q7 which is a voltage (Vbe) multiplier that takes the base to emitter voltage of Q7 and doubles that at its collector. This 1.2V reference varies with temperature. The other transistors in the circuit would be affected by ambient temperature such that as the temperature increased, then the DC level at TP2 would increase. The Q7 reference decreases by the amount necessary to keep the DC level at TP2 constant with temperature.

A peak rectifier section includes transistors Q8 and Q9. The signal at TP1 is DC isolated by C11. A new DC level is provided by the TempCo bias circuit at 1.2V such that the AC signal's bottom peak is at ground and the positive peak is at 2.4 volts. Transistor Q8 uses the positive peak to charge C6 through R48. Resistor R48 sets the "attack time" of the AC to DC converter. The discharge time or "hold time" for C6 is set by R49. The signal at the emitter of Q9 goes from zero volts to about 0.6 volts for all of the conditions likely to be present in the array.

A DC gain section is used because the control circuit 610 requires a larger voltage swing to work with. Transistor Q11 takes this 0.6-volt swing and increases it to a 4 volt swing. Transistor Q11 is called a current mirror and the actual voltage of ANALOG VCC does not affect the output DC level. The adjustment potentiometer VR2 is set so that a 2.4V peak-to-peak (P-P) signal at TP1 causes a 3.0V DC level at TP2.

The RF oscillator 620 provides a 100 kHz sine wave to the array. The signals coming off of the matrix 630 are very small. In order for these signals not to get lost in the noise, it is important that the 100 kHz provided to the matrix 630 is as large as possible. The power supply 605 includes an input battery supply voltage range that is 3.5V to 6.5V. The CD4051 multiplexer IC's used in the input switching circuit 625 have a max limit of 20V. The 100 kHz, 18 VAC sine wave signal outputted by RF oscillator 620 must be regulated for optimal performance of the system.

Figure 12:
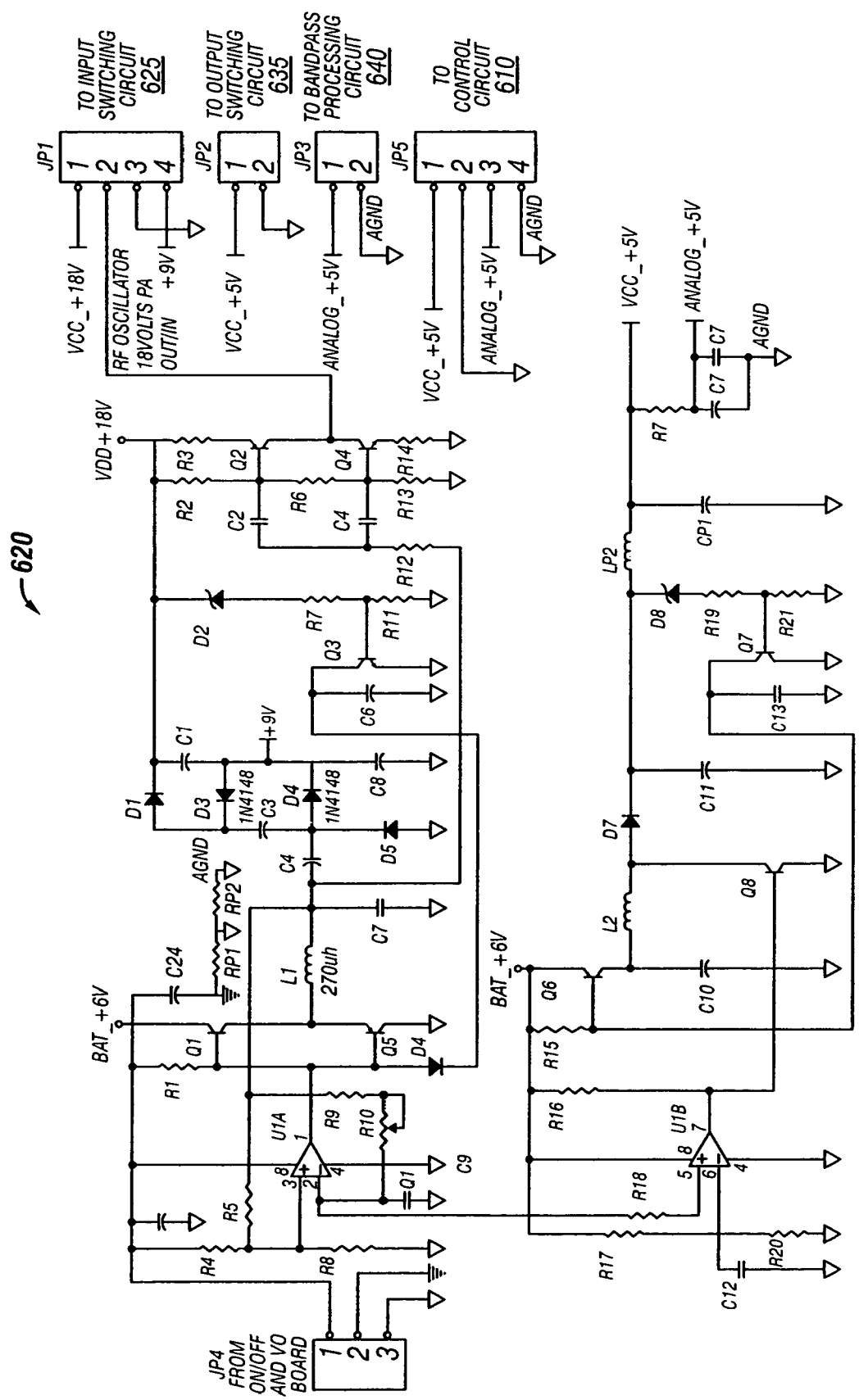
FIG. 12 is a circuit diagram of the RF oscillator and power supply of the circuit of FIG. 6.

FIG. 12 shows the RF oscillator 620 which includes a comparator, U1A, an LM393, that is the primary oscillator. As pin 1 switches to BAT +6V and ground the reference to pin 3 is shifted. A phase-delayed version of this is provided to pin 2 by R9, R10, and C9. This would cause a 100 kHz square wave oscillation if L1 were shorted and C7 were removed. The addition of L1 and C7 makes this a resonant oscillator. The frequency of peak amplitude is set by the actual values of L1 and C7. This can be anywhere from 95 kHz to 105 kHz. The R10 potentiometer adjusts the primary oscillator to this natural resonant frequency so that the voltage at C7 is at a maximum peak-to-peak voltage. Notice that the feedback to R5 and R9 comes from C7 so that the phase of the oscillating sine wave is used in the function of the primary oscillator.

This helps keep the frequency at maximum amplitude even as changes in inductance, capacitance, and temperature occur. It is important for C7 to be a Mylar capacitor, both for temperature stability and for low impedance and therefore high Q.

A voltage multiplier includes diodes D1, D3, D4, D5 and capacitors C1, C3, C4, C8. Even at a 3.5V battery voltage, the square wave at Q1 emitter is only 3V, but the sine wave at C7 is 10V peak-to-peak due to Q multiplication. The first stage of the multiplier does a peak-to-peak rectification to +9V DC at the cathode of D4. The next stage doubles this to +18V at VDD +18V.

A regulation loop is used to optimize system performance by insuring that both the sine wave and the +18V are well regulated. This is accomplished by zener D2, resistor divider R7 and R11 and Q3. As the +18V increases, the zener D2 conducts. As the voltage on the base of Q3 increases to a 0.65V threshold, the collector drop pulls down the upper voltage limit of the square wave driven to Q1 emitter. The peak level of this square wave determines the peak-to-peak level of the sine wave at C7, which in turn sets the level of the +18V. So the action of D2 and Q3 regulates both the +18V and the peak-to-peak value of the 100 kHz sine wave at the same time.

For the 100 kHz sine wave power driver, the highest voltage sine wave is 10V peak-to-peak. The action of Q2 and Q4 amplify this to 18V peak-to-peak, but this is a current amplifier so the actual level is completely dependent on the impedance that it is driving. This is very important because it lets us set the amplitude that is placed on each column individually. The matrix 630 is never perfectly uniform, but levels received off of the matrix 630 should be as uniform as possible. A bias resistor may be placed at the +9V node from each column driver Mux. These values are then adjusted to equalize the array so all columns are received at the same level even if their actual geometries are slightly different.

The capacitors C2 and C5 are low impedances at 100 kHz but couple and DC isolate the sine wave from C7. The resistor R12 to R2 and R13 sets up a divider such that 1.65 V AC is at the bases of Q2 and Q4. The bias string of R2, R6, and R13 provide 0.65V of bias to these two transistors. So there is a small bias current flowing from the collector of Q2 to the collector of Q4 even before the AC signal is applied. The positive half cycle of the 100 kHz shows up as a 1 Volt peak half cycle on R14. This causes a current of 1.5 ma peak through Q4 collector to ground. Similarly the negative half cycle shows up on R3 and Q2 sources 1.5 ma from VDD +18V. Thus, a current mode sine wave is present to the array at JP1 Pin 2 that is out of phase with the C7 voltage and can be varied from 18V down to 14V or less depending on the impedance selected after the Mux switch to the +9V node.

A regulated voltage (+5V) may be used for the control circuit 610 and the bandpass processing circuit 640. To isolate these two circuits, an R-C network of 100 ohms and 10 uf may be used. The required regulated voltage sits right in the middle of the 3.5V to 6.5V battery supply voltage range. There are no simple converter techniques for this situation. A flyback or "boost" type of switching converter is used to regulate the voltage. First, the +6V battery is attenuated to a voltage near 3V and then it is boosted to +5V and is regulated to that value by controlling the 3V level. So that it is a linear, the regulator is followed by a switching converter. The comparator section U1B uses the ramp waveform from U1A to make a 100 kHz square wave that is approximately a 50% duty cycle. This is always applied directly to Q8. The current is drawn through L2 as Q8 conducts and the energy stored in L2 flies back and is dumped onto C11 as Q8 turns off. The amount of energy that is stored and transferred to C11, and hence the voltage on C10, determines the output voltage. R15 and Q6, and the current drawn to ground by Q7, determine the voltage on C10. The zener D8 looks at the voltage on C11 and conducts to resistive divider R19 and R21. When C11 is near +5V then Q7 starts to conduct. As it conducts, it pulls down on R15 and the voltage on C10 is reduced. This in turn reduces the voltage on C11 and a complete regulation loop is achieved. The inductor LP2 and CP1 reduce switching ripple on the output.

Figure 13:
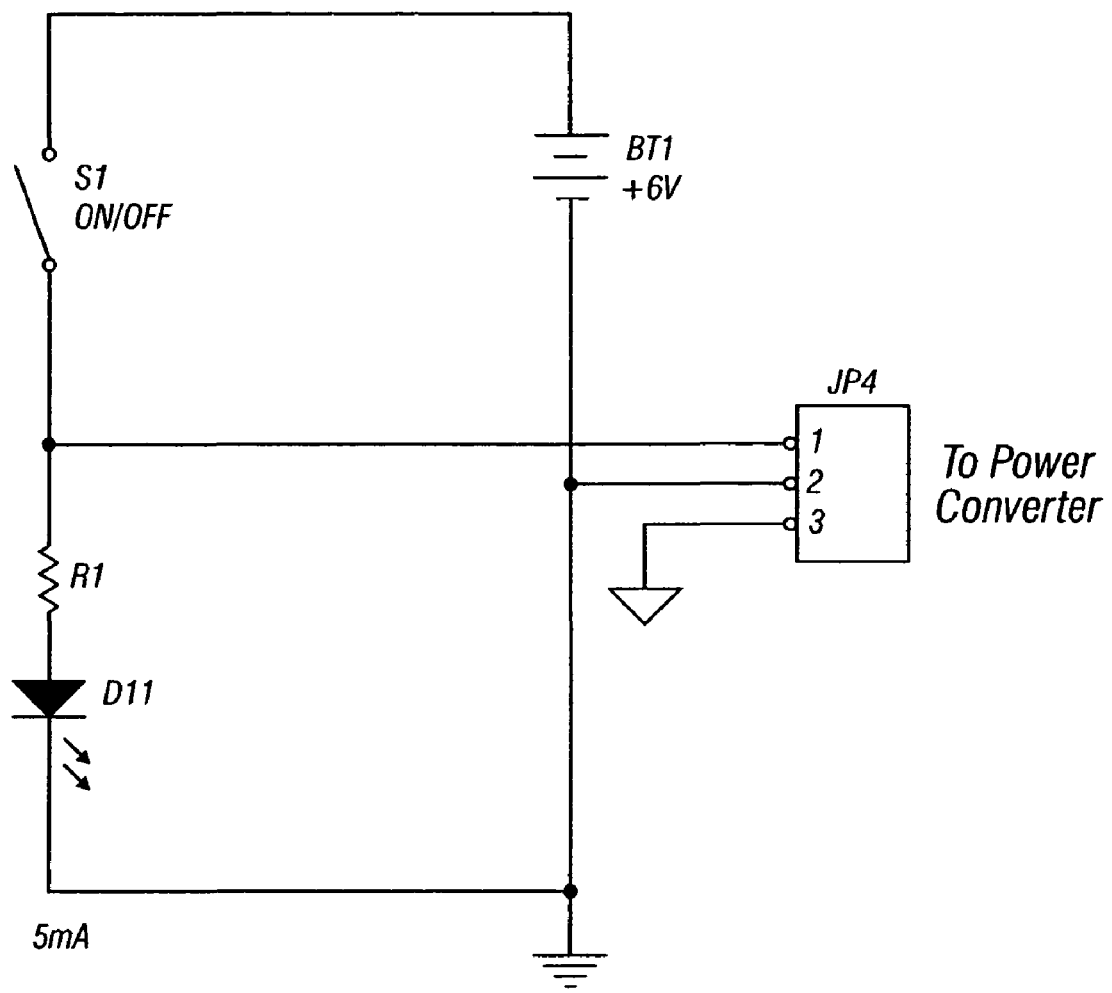
FIG. 13 is a circuit diagram of the On/Off and I/O sub-circuits of the circuit of FIG. 6.

FIG. 13 shows a schematic of On/Off and I/O sub-circuits which interface with connector JP4 of the circuit in FIG. 12. When power is applied by switching on switch S1, LED D11 is illuminated and power from battery BT1 is allowed to flow through connector JP4.

Figure 14A:
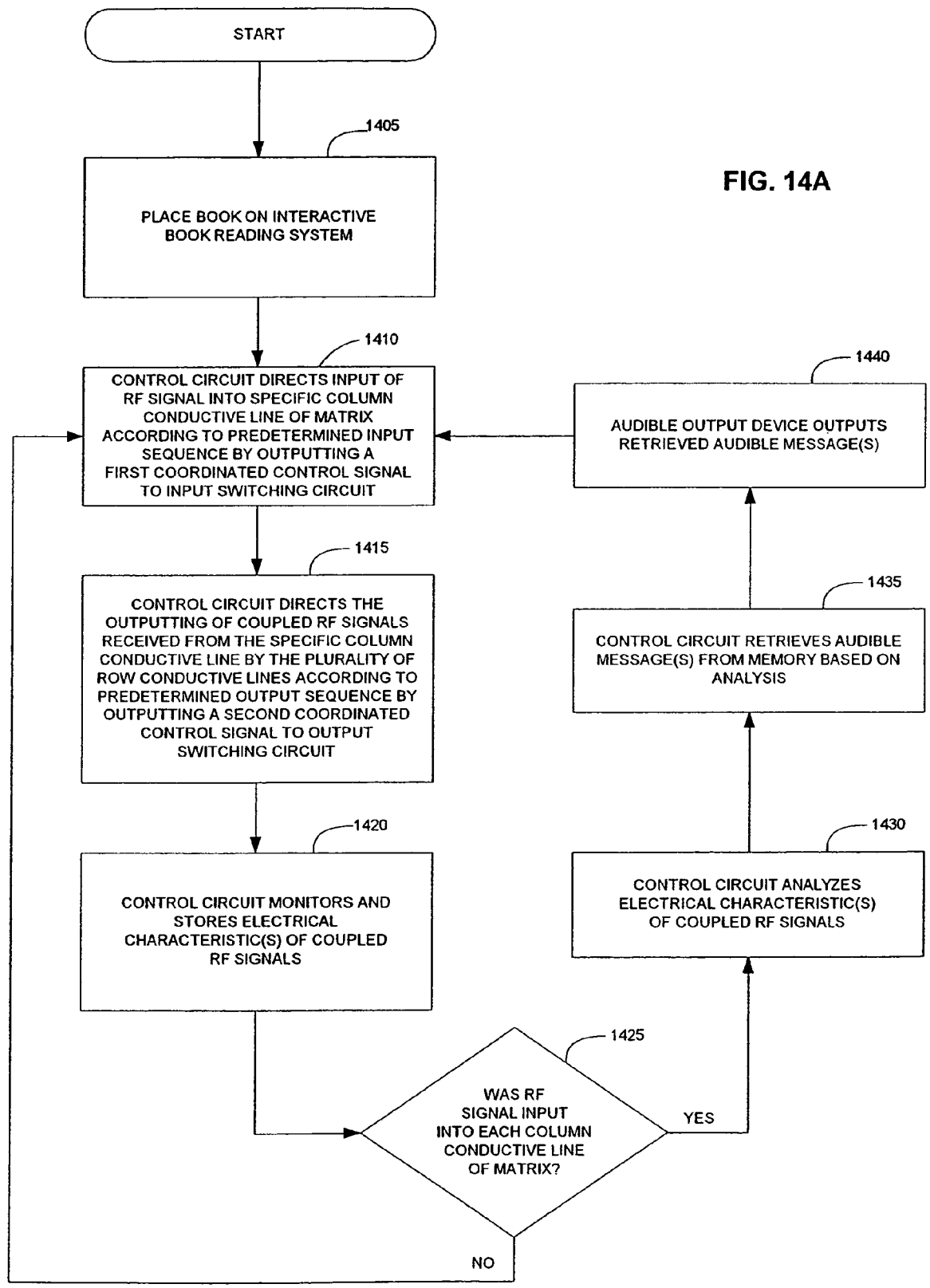
FIGS. 14A and 14B, taken together, show a high-level functional flowchart including steps implemented by the circuit of FIG. 6.
Figure 14B:
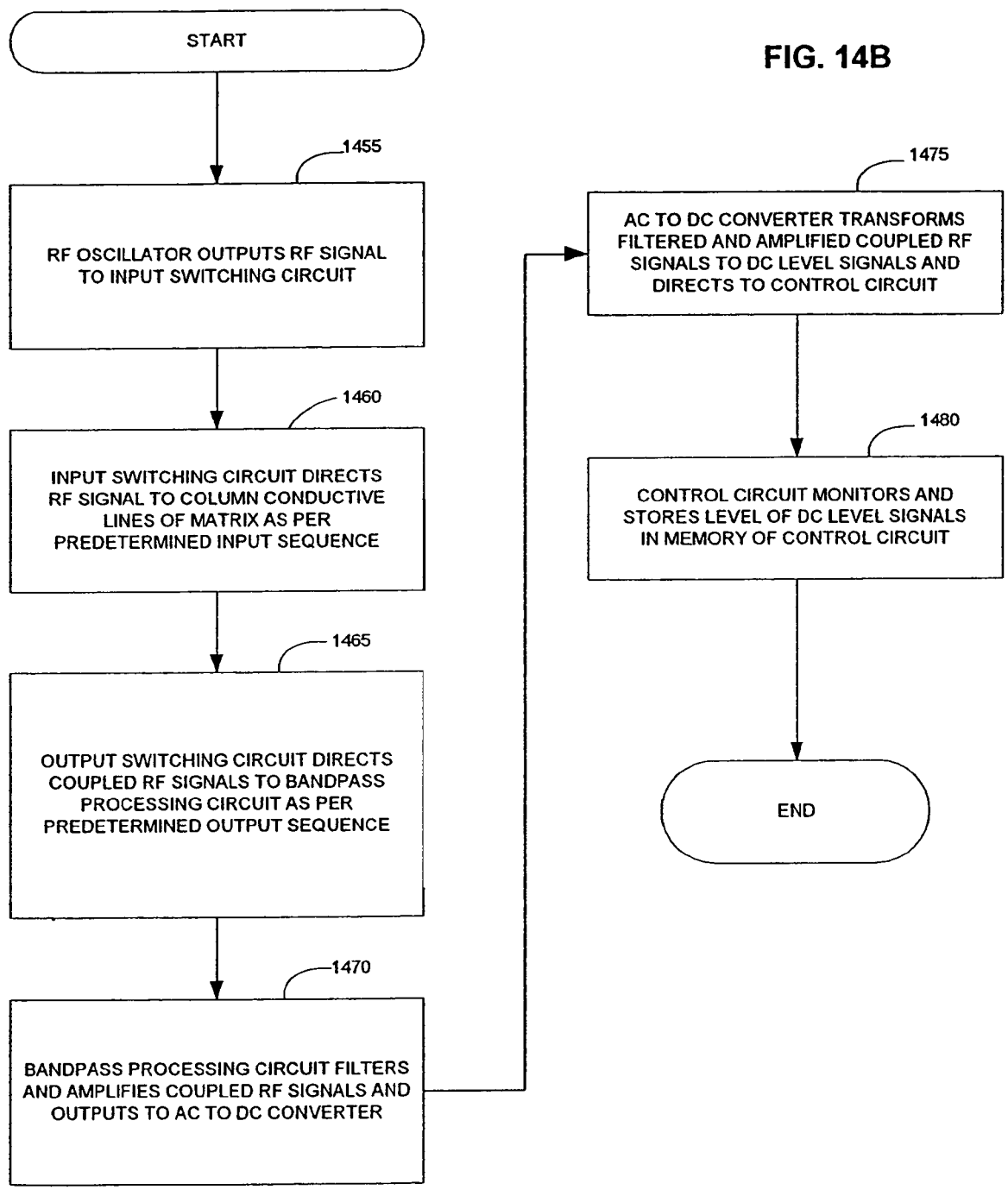

FIGS. 14A and 14B summarize an example of how the present invention operates in accordance with the exemplary embodiment of the present invention. Referring to FIG. 14A, in step 1405, a book 305 (see FIG. 3) is placed on the interactive book reading system 100 (see FIG. 3). In step 1410, control circuit 610 directs the input of an RF signal generated by RF oscillator 620 into a specific column conductive line of matrix 630 according to a predetermined input sequence by outputting a first coordinated control signal 655 to the input switching circuit 625. In step 1415, control circuit 610 directs the outputting of coupled RF signals received from the specific column conductive line by the plurality of row conductive lines according to a predetermined output sequence by outputting a second coordinated control signal 660 to the output switching circuit 635. The coupled RF signals provide position information on the proximity of the human finger. In step 1420, the control circuit 610 monitors and stores one or more electrical characteristics of the resulting coupled RF signals. Steps 1410, 1415 and 1420 are then repeated for each of the column conductive lines of matrix 630. Once it is determined that a complete scan sequence was executed, whereby the RF signal is input into each conductive line of matrix 630 (step 1425), the control circuit 610 performs an analysis on the electrical characteristics of the coupled RF signals (step 1430), and retrieves one or more audible messages from the memory 615 based on the analysis (step 1435). In step 1440, an audible output device 650 outputs audible messages retrieved from the memory 615 by the control circuit 610.

Referring to FIGS. 6 and 14B, in step 1455, the RF oscillator 620 outputs an RF signal to the input switching circuit 625. In step 1460, the input switching circuit 625 directs the RF signal to the column conductive lines of matrix 630 according to the predetermined input sequence. In step 1465, the output switching circuit directs the coupled RF signals to the bandpass processing circuit 640 according to the predetermined output sequence. In step 1470, the bandpass processing circuit 640 filters and amplifies the coupled RF signals, and directs the filtered and amplified coupled RF signals to the AC to DC converter 645. In step 1475, the AC to DC converter 645 transforms the filtered and amplified coupled RF signals to DC level signals, and directs the DC level signals to the control circuit 610. In step 1480, the control circuit monitors and stores the level of the DC level signals in a memory within the control circuit 610.

It will be appreciated by those skilled in the art that changes could be made to the embodiments described above without departing from the broad inventive concept thereof. For example, the present invention can be used with books to sense the location of a human finger or other digit without contacting the surface of the matrix 630 beneath the book. It should be appreciated that the RF scanning circuit 675 can be used directly, for example, without a book or card or sheet, but with indicia formed or printed on an upper surface over the circuit with software responsive to the designation of different locations on the surface by touching or nearly touching the location on the surface. In this way, the RF scanning circuit 675 of the present invention could be used in place of other conventional touch screens in other book reading systems as well as in other educational and entertainment systems. It is understood, therefore, that this invention is not limited to the particular embodiments disclosed, but it is intended to cover modifications within the spirit and scope of the present invention as defined by the appended claims.

What is claimed is:

1. An interactive book reading system responsive to a human finger presence, the system comprising:
   (a) a radio frequency (RF) scanning circuit configured to detect the presence of a human finger when the finger enters an RF field generated by the RF scanning circuit;
   (b) a control circuit in communication with the RF scanning circuit;
   (c) a memory in communication with the control circuit (610), the memory storing a plurality of audible messages; and
   (d) an audible output device in communication with the control circuit, wherein the audible output device outputs at least one of the audible messages based on an analysis of the RF field performed by the control circuit when the finger enters the RF field;
   wherein the control circuit is configured to analyze and select as a probable user input a single probable human finger presence from among a plurality of possible human finger presences detected simultaneously by the scanning circuit;
   wherein the scanning circuit includes a matrix of conductive lines arranged as a first plurality parallel to and spaced apart from one another and a second plurality oriented transversely to the first plurality of conductive lines, the second plurality being parallel to and spaced apart from one another and separated from the first plurality of conductive lines by an electrically insulated layer;
   wherein the matrix has a preferred orientation with a side most proximal a user designated as a southern side of the matrix and a side opposite from and most distal to the user and to the southern side designated as a northern side of the matrix; and
   wherein the control circuit is configured to select from among the plurality of possible human finger presences sensed simultaneously by the scanning circuit, a single most northern possible human finger presence as the probable user input.

2. The interactive book reading system of claim 1 wherein the RF scanning circuit further comprises an RF oscillator which generates the RF signal that is input into the specific column conductive line.

3. The interactive book reading system of claim 2 wherein the RF scanning circuit further comprises an input switching circuit in communication with the control circuit, the RF oscillator and the column conductive lines of the matrix, the input switching circuit receiving the first coordinated control signal from the control circuit and the RF signal generated by the RF oscillator, the input switching circuit sequentially routing the RF signal generated by the RF oscillator to each of the column conductive lines according to the predetermined input sequence.

4. The interactive book reading system of claim 2 wherein the RF scanning circuit further comprises an output switching circuit in communication with the control circuit and the row conductive lines of the matrix, the output switching circuit receiving the second control signal from the control circuit and the coupled RF signals, the output switching circuit sequentially outputting the RF coupled signals according to the predetermined output sequence.

5. The interactive book reading system of claim 1 wherein the RF scanning circuit further comprises a bandpass processing circuit in communication with the control circuit and the matrix, the bandpass processing circuit amplifying and filtering the coupled RF signals, and routing the amplified and filtered coupled RF signals to the control circuit for analysis.

6. The interactive book reading system of claim 5 wherein the amplified and filtered coupled RF signals are AC voltage sine wave signals.

7. The interactive book reading system of claim 5 further comprising an AC to DC converter in communication with the control circuit and the bandpass processing circuit, wherein the AC to DC converter transforms a peak of the amplified and filtered coupled RF signals to DC level signals.

8. The interactive book reading system of claim 5 wherein the bandpass processing circuit includes a bandpass filter and a bandpass amplifier.

9. The interactive book reading system of claim 1 wherein the control circuit includes a microcontroller.

10. A method of using the interactive book reading system of claim 1 responsive to the presence of a human finger, the method comprising the steps of:
    (a) detecting the human finger as the finger enters an RF field generated by the scanning circuit of the reading system; and
    (b) outputting at least one of a plurality of stored audible messages based on an analysis of the RF field when the finger enters the RF field.

11. The method of claim 10 wherein the first plurality of conductive lines are arranged as a plurality of spaced apart column conductive lines extending between the northern and southern sides of the matrix and wherein the second plurality of conductive lines are arranged as a plurality of spaced apart row conductive lines generally perpendicular to the plurality of column conductive lines, and wherein step (a) further comprises:
    (a)(i) inputting an RF signal into a specific one of the plurality of column conductive lines according to a predetermined input sequence;
    (a)(ii) outputting coupled RF signals received from the specific column conductive line by the plurality of row conductive lines according to the predetermined output sequence; and
    (a)(iii) repeating steps (a)(i) and (a)(ii) for each of the column conductive lines.

12. The method of claim 11, further comprising analyzing one or more electrical characteristics of the coupled RF signals after the RF signal is input into all of the column conductive lines.

13. The method of claim 11, further comprising:
    (c) amplifying and filtering the coupled RF signals; and
    (d) transforming a peak of the amplified and filtered coupled RF signals to DC level signals.

14. The method of claim 11 wherein the inputting step comprises providing the RF signal at a predetermined frequency to input into the specific one of the plurality of column conductive lines and wherein the outputting step further comprises outputting only coupled RF signals at the predetermined frequency for the detecting step.

15. The method of claim 11 further comprising the steps of storing a DC peak of the received RF signals from each of the column conductive lines for each row conductive line and thereafter comparing the stored DC peak of the received RF signals with a DC peak of the subsequently received RF signals from the same row conductive line-column conductive line pairs to locate a detected human figure with respect to the matrix.

16. The interactive book reading system of claim 1 wherein the control circuit is further configured to select from among a plurality of possible human finger presences detected at least generally simultaneously by the scanning circuit as a probable user input, a single sensed possible human finger presence that extends from and yet adjoins on one side a cluster of the plurality of possible human finger presences sensed by the scanning circuit, wherein the single sensed possible human finger presence that extends need not be the single most northern possible human presence sensed.

17. The interactive book reading system of claim 1 wherein the control circuit is further configured to select from among the plurality of stored audible messages an audible message instructing the user to make another selection if the control circuit is unable to select the probable user input from among a plurality of possible human finger presences sensed at least generally simultaneously by the scanning circuit.

18. A method of using the interactive book reading system of claim 1, the method comprising the steps of:
(a) detecting the human finger as the finger enters an RF field generated by the scanning circuit of the reading system;
(b) outputting at least one of a plurality of stored audible messages based on an analysis of the RF field when the finger enters the RF field; and
between the detecting and outputting steps, the steps of analyzing and first selecting from among a plurality of possible human finger presences detected at least generally simultaneously entering the RF field, a single possible human finger entry as a probable user input and further selecting based upon the probable user input, at least one of the stored audible messages.

19. The method of claim 18 wherein the first selecting step further comprises selecting from among the plurality of possible human finger presences detected at least generally simultaneously entering the RF field, a single most northern point of detected RF field entry as the probable user input.

20. The method of claim 18 wherein the first selecting step further comprises selecting as the user input, a single sensed possible human finger RF field entry that extends from and yet adjoins on one side of a cluster of the detected plurality of possible human finger RF field entry locations, wherein the single sensed possible human finger presence that extends need not be the single most northern possible human presence sensed.

21. The method of claim 18 wherein the outputting step comprises instructing the user to make another selection if the system is unable to select the probable user input from among a plurality of possible human finger RF field entries detected at least generally simultaneously entering the RF field.

22. The interactive book reading system of claim 1 wherein the first plurality of conductive lines are arranged as a plurality of spaced apart column conductive lines extending between the northern and southern sides of the matrix and wherein the second plurality of conductive lines are arranged as a plurality of spaced apart row conductive lines generally perpendicular to the plurality of column conductive lines, and further comprising a signal generator configured to generate at a predetermined frequency, the RF signal input into the specific column conductive line and wherein the radio frequency scanning circuit further comprises a bandpass filter selected to pass to the control circuit only those coupled signals from the plurality of row conductive lines at the predetermined frequency.

23. The interactive book reading system of claim 1 wherein the first plurality of conductive lines are arranged as a plurality of spaced apart column conductive lines extending between the northern and southern sides of the matrix and wherein the second plurality of conductive lines are arranged as a plurality of spaced apart row conductive lines generally perpendicular to the plurality of column conductive lines, and wherein the memory is further configured to store a DC peak of the received RF signals from each of the column conductive lines for each row conductive line and wherein the control circuit is configured to compare the stored DC peak of the received RF signals with a DC peak of the subsequently received RF signals from the same row conductive line-column conductive line pairs to locate a detected human figure with respect to the matrix.

24. The interactive book reading system of claim 1 wherein the control circuit is further configured to:
read and store values of cross-points of the matrix from an original scan without a human presence in the RF field to obtain a reference value for each cross-point of the matrix; and
compare successive scans of values from the cross-points of the matrix with the reference values of the cross-points to determine the proximity of a human finger.

25. The interactive book reading system of claim 24 wherein the control circuit is configured to analyze and select as a probable user input, a single probable human finger presence from among a plurality of possible human finger presences detected simultaneously by being configured to calculate a dynamic threshold of the matrix for each scan of the matrix after the initial reference value generating scan.

26. The interactive book reading system of claim 25 wherein the control circuit is configured to calculate the dynamic threshold by being configured to:
difference a currently measured value from each cross-point with the reference value of the cross-point to generate a current difference value for each cross-point;
determine a highest current difference value for each of a number of the row conductive lines scanned;
sum together the highest current difference values for the number of row conductive lines scanned and divide the sum by the number to identify a dynamic threshold for the scan;
identify current difference values of the scan greater than the dynamic threshold for the scan to identify each cross-point generating one of the identified current difference values as a probable human finger presence.

27. An interactive book reading system responsive to the presence of a human finger through pages of a book, the system comprising:
(a) a radio frequency (RF) scanning circuit configured to detect the presence and location of human fingers through multiple pages of a book when the fingers are within an RF field generated above the RF scanning circuit, the RF scanning circuit including a series of cross-points formed by a matrix of narrow trace width conductive lines arranged as a plurality of spaced apart column conductive lines on a first major side of an electrically insulative sheet and a plurality of spaced apart row conductive lines transverse to the plurality of column conductive lines on a second major side of the electrically insulative sheet opposite the first side, the width of the conductive lines being minimized to reduce capacitive couple effect between the conductive lines at the cross-points;

(b) a control circuit operatively connected with the plurality of column conductive lines and the plurality of row conductive lines and wherein for each specific column conductive line (i) an RF signal is input into the specific column conductive line according to a predetermined input sequence as directed by a first coordinated control signal outputted by the control circuit, and wherein (ii) coupled RF signals received from the specific column conductive line by the plurality of row conductive lines are outputted according to a predetermined output sequence as directed by a second coordinated control signal outputted by the control circuit;

(c) a sensor memory in communication with the RF scanning circuit and the control circuit so as to store one or more characteristics of the coupled RF signal from each cross-point;

(d) a content memory in communication with the control circuit and storing a plurality of audible messages associated with content of the book;

(e) an audible output device in communication with the control circuit, wherein the audible output device outputs at least one of the audible messages from the content memory based on an analysis of the RF field of each cross-point performed by the control circuit on the coupled RF signal characteristics stored in the sensor memory when the finger enters the RF field; and (f) a dielectric spacer 0.06 inches or more thick positioned over the scanning circuit so as to separate at least a plurality of pages of a book positioned on the spacer from RF scanning circuit beneath the spacer and reduce effect of moisture on the sensitivity of the matrix; and wherein the scanning circuit detects human finger presences away from the matrix and spacer and above the plurality of pages through the plurality of pages and the spacer;

wherein the control circuit is configured to analyze and select as a probable user input a single probable human finger presence from among a plurality of possible human finger presences detected simultaneously by the scanning circuit;

wherein the first plurality of conductive lines are arranged parallel to one another and the second plurality of conductive lines are arranged parallel to one another;

wherein the matrix has a preferred orientation with a side most proximal a user designated as a southern side of the matrix and a side opposite from and most distal to the user and to the southern side designated as a northern side of the matrix; and wherein the control circuit is configured to select from among the plurality of possible human finger presences sensed simultaneously by the scanning circuit, a single most northern possible human finger presence as the probable user input.

28. The interactive book reading system of claim 27 wherein:

the control system is further configured to select from the plurality of possible human finger presences detected by the scanning array as the probable user input one of at least two of the possible human finger presences sensed by the scanning array to be most northern of all the plurality and at least approximately equally most northern on the matrix.

29. An interactive book reading system responsive to the presence of a human finger through pages of a book, the system comprising:

(a) a radio frequency (RF) scanning circuit configured to detect the presence and location of human fingers through multiple pages of a book when the fingers are within an RF field generated above the RF scanning circuit, the RF scanning circuit including a series of cross-points formed by a matrix of narrow trace width conductive lines arranged as a plurality of spaced apart column conductive lines on a first major side of an electrically insulative sheet and a plurality of spaced apart row conductive lines transverse to the plurality of column conductive lines on a second major side of the electrically insulative sheet opposite the first side, the width of the conductive lines being minimized to reduce capacitive couple effect between the conductive lines at the cross-points;

(b) a control circuit operatively connected with the plurality of column conductive lines and the plurality of row conductive lines and wherein for each specific column conductive line (i) an RF signal is input into the specific column conductive line according to a predetermined input sequence as directed by a first coordinated control signal outputted by the control circuit, and wherein (ii) coupled RF signals received from the specific column conductive line by the plurality of row conductive lines are outputted according to a predetermined output sequence as directed by a second coordinated control signal outputted by the control circuit;

(c) a sensor memory in communication with the RF scanning circuit and the control circuit so as to store one or more characteristics of the coupled RF signal from each cross-point;

(d) a content memory in communication with the control circuit and storing a plurality of audible messages associated with content of the book;

(e) an audible output device in communication with the control circuit, wherein the audible output device outputs at least one of the audible messages from the content memory based on an analysis of the RF field of each cross-point performed by the control circuit on the coupled RF signal characteristics stored in the sensor memory when the finger enters the RF field; and (f) a dielectric spacer 0.06 inches or more thick positioned over the scanning circuit so as to separate at least a plurality of pages of a book positioned on the spacer from RF scanning circuit beneath the spacer and reduce effect of moisture on the sensitivity of the matrix; and wherein the scanning circuit detects human finger presences away from the matrix and spacer and above the plurality of pages through the plurality of pages and the spacer; and wherein the control system is further configured to select from the plurality of possible human finger presences detected by the scanning array as the probable user input one of at least two of the possible human finger presences sensed by the scanning array to be most northern of all the plurality and at least approximately equally most northern on the matrix.

* * * * *